US012718629B2

(12) United States Patent
Maddock et al.

(10) Patent No.: US 12,718,629 B2
(45) Date of Patent: Aug. 25, 2026

(54) IMPACT DETECTION SYSTEM FOR VEHICLE

(71) Applicant: APPY RISK TECHNOLOGIES LIMITED, Crewe (GB)

(72) Inventors: Robert Maddock, Crewe (GB); Alex Wheeler, Crewe (GB); Raphael Ribard, Crewe (GB)

(73) Assignee: APPY RISK TECHNOLOGIES LIMITED, Cheshire (GB)

( * ) Notice: Subject to any disclaimer, the term of this patent is extended or adjusted under 35 U.S.C. 154(b) by 290 days.

(21) Appl. No.: 18/266,421

(22) PCT Filed: Dec. 10, 2021

(86) PCT No.: PCT/GB2021/053240

§ 371 (c)(1), (2) Date: Jun. 9, 2023

(87) PCT Pub. No.: WO2022/123264

PCT Pub. Date: Jun. 16, 2022

(65) Prior Publication Data

US 2024/0104969 A1 Mar. 28, 2024

(30) Foreign Application Priority Data

Dec. 10, 2020 (GB) ..................................... 2019514

(51) Int. Cl.
*G07C 5/00* (2006.01)
*G06F 8/51* (2018.01)
*G07C 5/08* (2006.01)

(52) U.S. Cl.
CPC .............. *G07C 5/008* (2013.01); *G06F 8/51* (2013.01); *G07C 5/0808* (2013.01)

(58) Field of Classification Search
CPC .......... G07C 5/008; G07C 5/0808; G06F 8/51
USPC ........................................................ 701/31.4
See application file for complete search history.

(56) References Cited

U.S. PATENT DOCUMENTS 7,313,467 B2 * 12/2007 Breed .............. B60R 21/01534 701/32.7
7,672,756 B2 * 3/2010 Breed ................... G07C 5/008 701/1
8,725,346 B2 * 5/2014 Xu ...................... B60R 21/0136 340/436
9,818,239 B2 * 11/2017 Pal ...................... G08B 25/001
(Continued)

OTHER PUBLICATIONS

International Search Report issued in International Patent Application No. PCT/GB2021/053240, dated Feb. 1, 2022.
(Continued)

*Primary Examiner* — Luis A Martinez Borrero
(74) *Attorney, Agent, or Firm* — GREENBLUM & BERNSTEIN, P.L.C.

(57) ABSTRACT

An impact detection system for a vehicle includes an in-vehicle information capture device for vehicle monitoring having at least one sensor to capture input information in relation to at least one measurable parameter relating to the vehicle, and a mobile computing device operating a software application with an impact detection algorithm to detect an impact based on the information sensed by the in-vehicle information capture device and when an impact is detected, to push an electronic notification of the impact detection to a third-party system.

19 Claims, 18 Drawing Sheets

(56) References Cited

U.S. PATENT DOCUMENTS 9,994,218 B2 * 6/2018 Pal .......................... B60R 25/24
10,137,889 B2 * 11/2018 Pal .......................... H04W 4/40
10,157,321 B2 * 12/2018 Becker .................. B60W 40/08
10,279,804 B2 * 5/2019 Pal ......................... G08G 1/012
10,848,913 B2 * 11/2020 Pal ......................... G07C 5/008
11,288,750 B1 * 3/2022 Baker .................... G07C 5/008
11,308,737 B1 * 4/2022 Smith ................... H04W 4/023
11,375,338 B2 * 6/2022 Pal ........................... G07C 5/02
11,922,734 B1 * 3/2024 Kellett ................... G07C 5/085
2008/0042410 A1 * 2/2008 Breed ................. B60R 21/0132
340/436
2008/0114502 A1 * 5/2008 Breed ................... B60R 21/235
701/2
2008/0161989 A1 * 7/2008 Breed .................... G07C 5/008
701/31.4
2008/0284575 A1 * 11/2008 Breed .................. H01H 35/146
701/31.4
2013/0151065 A1 * 6/2013 Ricci ...................... G08C 19/00
701/1
2017/0053461 A1 * 2/2017 Pal ......................... G08G 1/012
2017/0221283 A1 * 8/2017 Pal ......................... G06Q 40/08
2017/0232963 A1 * 8/2017 Pal ......................... G08B 25/00
280/801.1
2018/0033220 A1 * 2/2018 Pal ....................... G07C 5/0866
2018/0293446 A1 * 10/2018 Becker ................... G06V 20/56
2019/0202448 A1 * 7/2019 Pal ........................ H04W 4/029
2021/0044928 A1 * 2/2021 Pal ....................... G06V 20/597
2022/0126842 A1 * 4/2022 Lewin ................. B60W 40/105
2022/0286811 A1 * 9/2022 Pal ......................... G08G 1/012
2023/0289663 A1 * 9/2023 Brook, III ................ G06N 3/08
2024/0095836 A1 * 3/2024 Sanchez ................. G07C 5/008

OTHER PUBLICATIONS

Written Opinion of the International Searching Authority issued in International Patent Application No. PCT/GB2021/053240, dated Feb. 1, 2022.

* cited by examiner

To Figure 7B

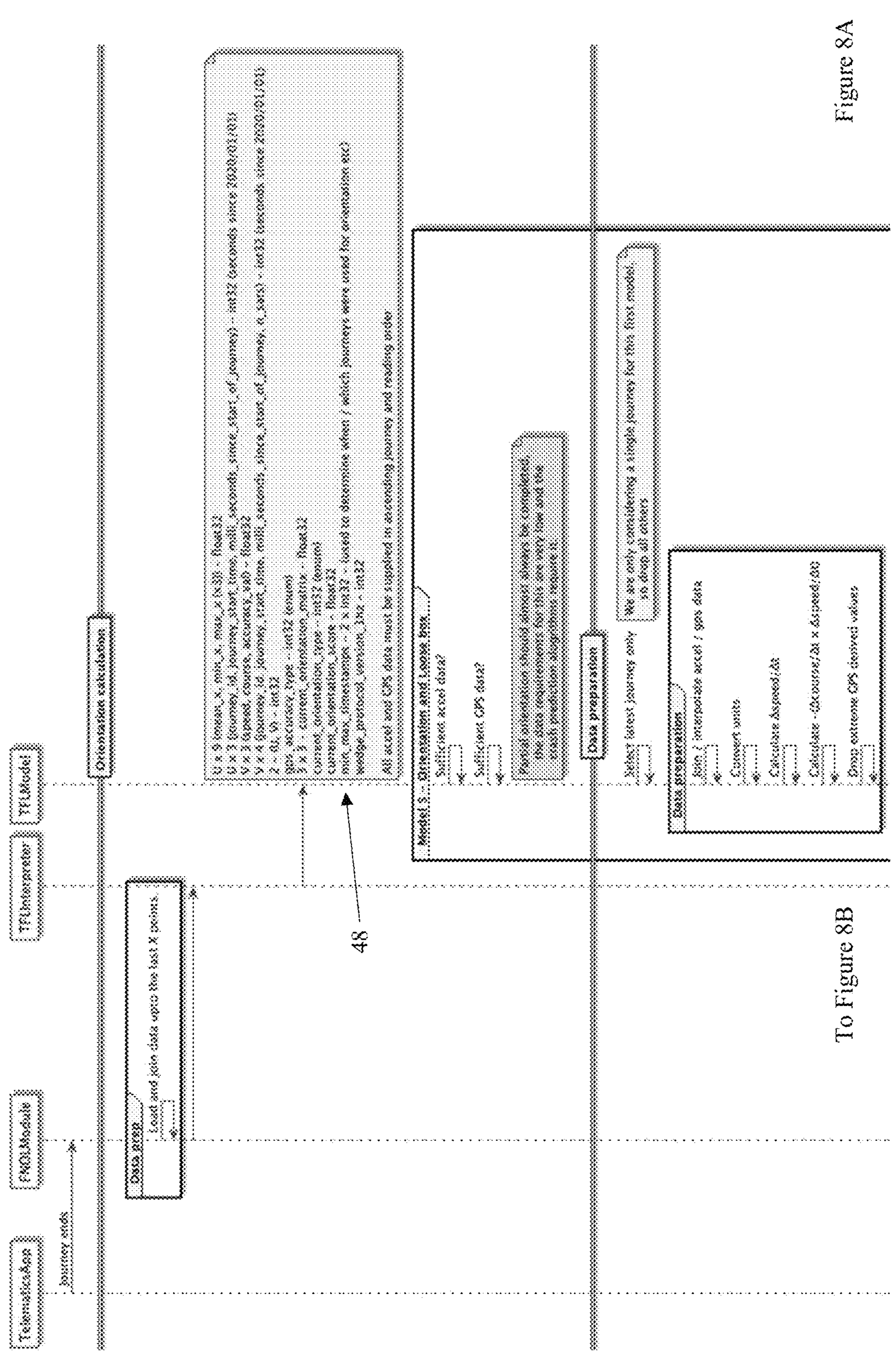
TelematicsApp
FNOLModule
TFLInterpreter
TFLModel
Journey ends
Orientation calculation
Data prep
Load and join data upto the last X points.
U x 9 (mean_x, min_x, max_x (x3)) - float32
U x 3 (journey_id, journey_start_time, milli_seconds_since_start_of_journey) - int32 (seconds since 2020/01/01)
V x 3 (speed, course, accuracy_xy) - float32
V x 4 (journey_id, journey_start_time, milli_seconds_since_start_of_journey, n_sats) - int32 (seconds since 2020/01/01)
2 - (U, V) - int32
gps_accuracy_type - int32 (enum)
3 x 3 - current_orientation_matrix - float32
current_orientation_type - int32 (enum)
current_orientation_score - float32
min_max_timestamps - 2 x int32 - (used to determine when / which journeys were used for orientation etc)
wedge_protocol_version_1hz - int32
All accel and GPS data must be supplied in ascending journey and reading order
48
Model 5 - Orientation and Loose box
Sufficient accel data?
Sufficient GPS data?
Partial orientation should almost always be completed, the data requirements for this are very low and the crash prediction algorithms require it.
Data preparation
Select latest journey only
We are only considering a single journey for this first model, so drop all others
Data preparation
Join / interpolate accel / gps data
Convert units
Calculate Δspeed/Δt
Calculate -(Δcourse/Δt x Δspeed/Δt)
Drop extreme GPS derived values
To Figure 8B
Figure 8A From Figure 8A Orientation calculation alt proposed_orientation_type = UNORIENTED insufficient_accel_data = True Partial orientation Filter low-speed data, if speed available Calculate unit vector Calculate z-transform matrix proposed_orientation_matrix = result proposed_orientation_score = Z / 9.81 alt [threshold1 < orientation_score < threshold2?]

proposed_orientation_type = PARTIAL_ORIENTATION proposed_orientation_type = UNORIENTED alt [Insufficient GPS data OR Insufficient Accel data OR orientation_type == UNORIENTED]

Figure 8B:
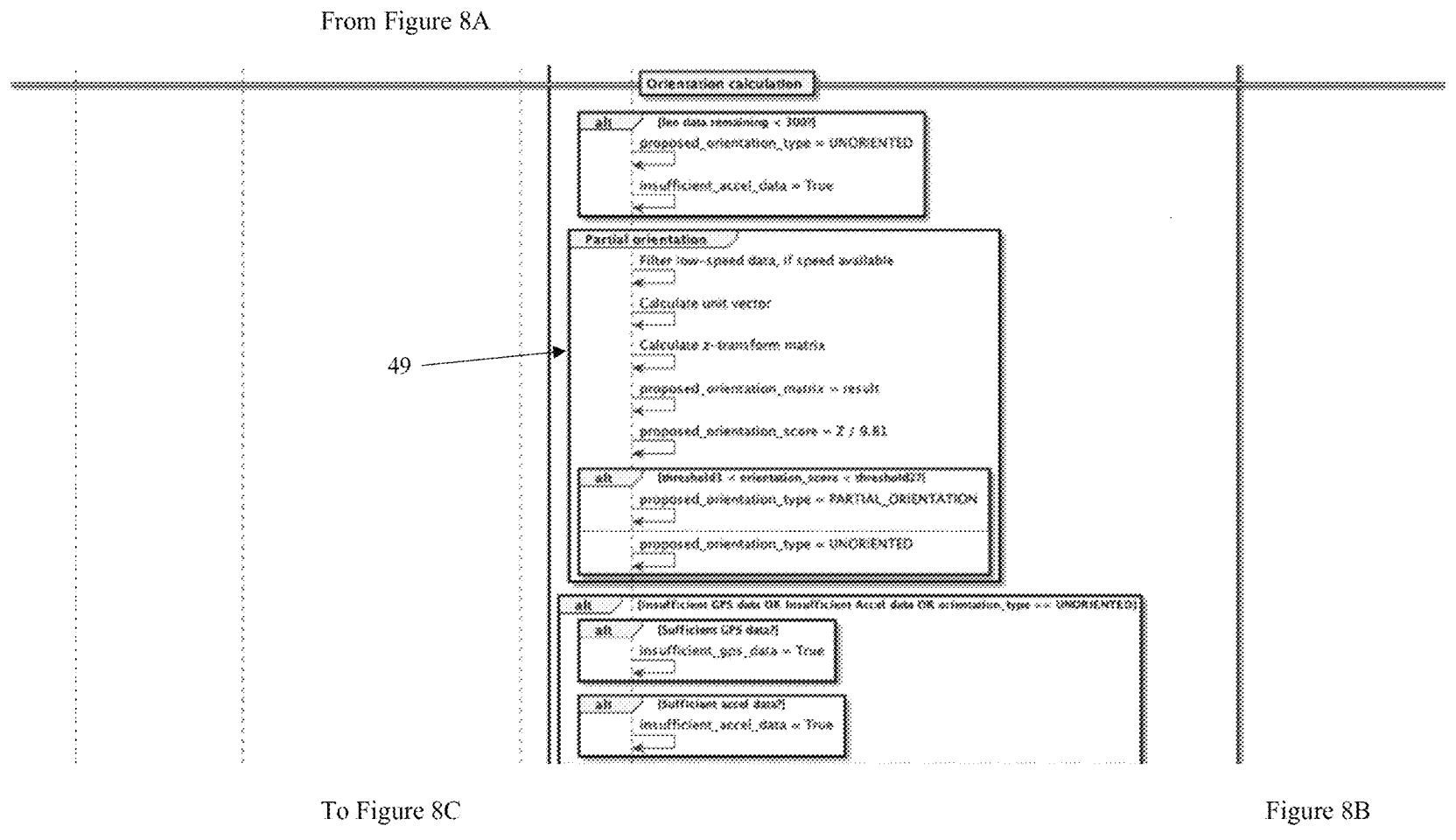

alt [Sufficient GPS data?]

insufficient_gps_data = True alt [Sufficient accel data?]

insufficient_accel_data = True

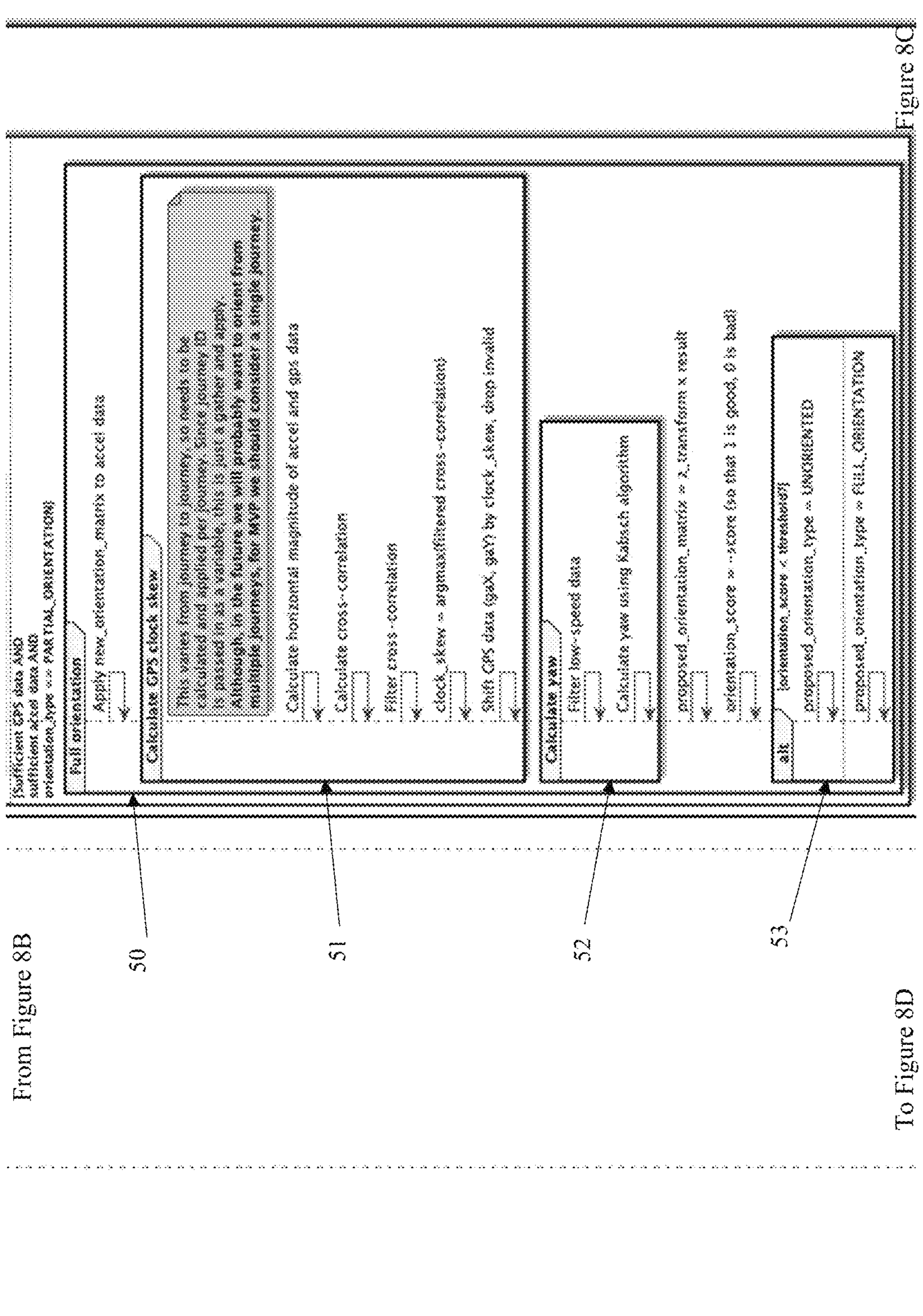
[Sufficient GPS data AND
sufficient accel data AND
orientation_type == PARTIAL_ORIENTATION]
Full orientation
Apply new_orientation_matrix to accel data
Calculate GPS clock skew
This varies from journey to journey, so needs to be calculated and applied per journey. Since journey ID is passed in as a variable, this is just a gather and apply.
Although, in the future we will probably want to orient from multiple journeys, for MVP we should consider a single journey
Calculate horizontal magnitude of accel and gps data
Calculate cross-correlation
Filter cross-correlation
clock_skew = argmax(filtered cross-correlation)
Shift GPS data (gaX, gaY) by clock_skew, drop invalid
Calculate yaw
Filter low-speed data
Calculate yaw using Kabsch algorithm
proposed_orientation_matrix = z_transform x result
orientation_score = -score (so that 1 is good, 0 is bad)
alt
[orientation_score < threshold]
proposed_orientation_type = UNORIENTED
proposed_orientation_type = FULL_ORIENTATION
Figure 8C
From Figure 8B
To Figure 8D
50
51
52
53

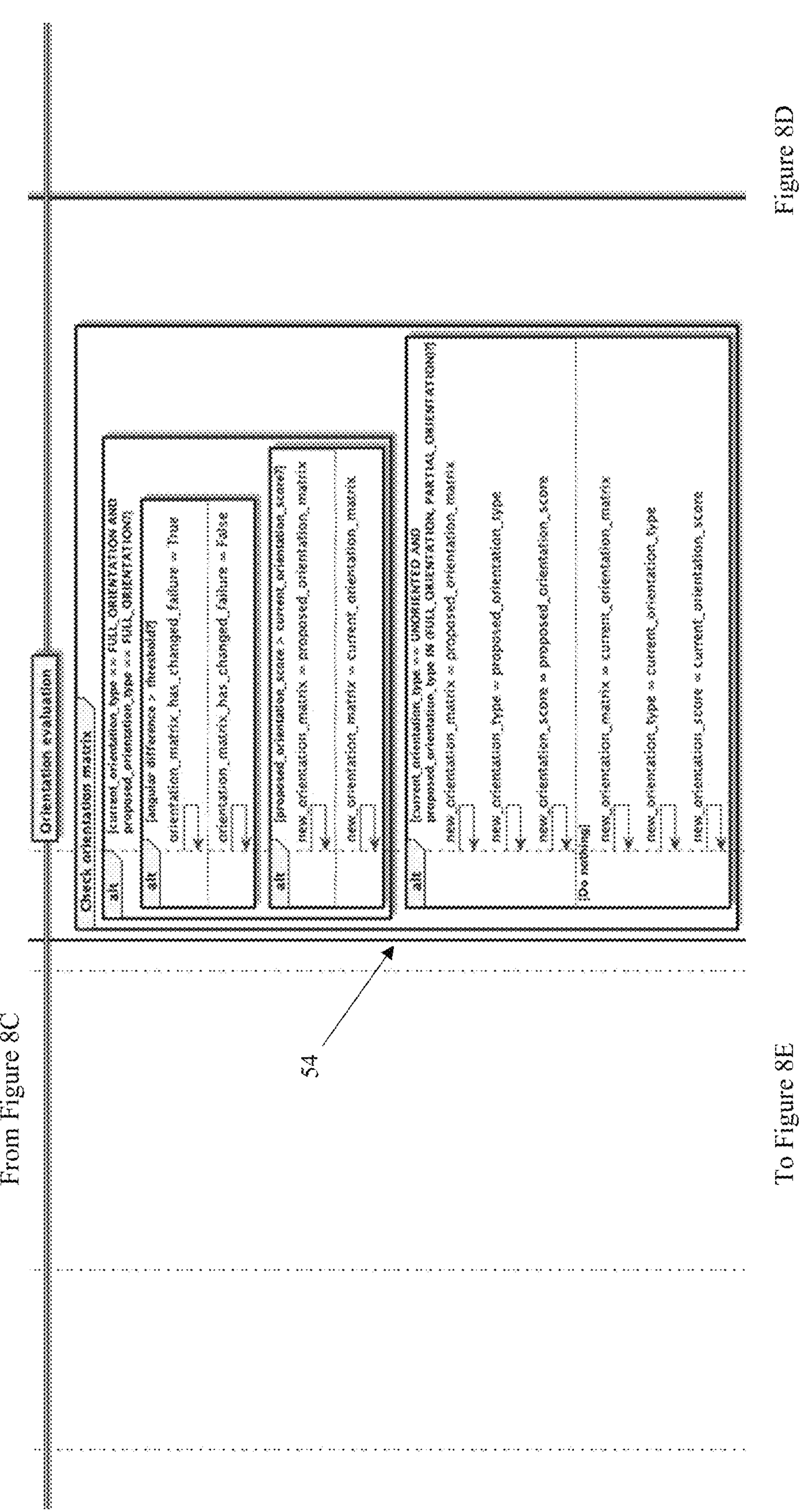

From Figure 8C
Orientation evaluation
Check orientation matrix
alt
[current_orientation_type == FULL_ORIENTATION AND proposed_orientation_type == FULL_ORIENTATION?]
alt
[angular difference > threshold?]
orientation_matrix_has_changed_failure = True
orientation_matrix_has_changed_failure = False
alt
[proposed_orientation_score > current_orientation_score?]
new_orientation_matrix = proposed_orientation_matrix
new_orientation_matrix = current_orientation_matrix
alt
[current_orientation_type == UNORIENTED AND proposed_orientation_type IN (FULL_ORIENTATION, PARTIAL_ORIENTATION)?]
new_orientation_matrix = proposed_orientation_matrix
new_orientation_type = proposed_orientation_type
new_orientation_score = proposed_orientation_score
[Do nothing]
new_orientation_matrix = current_orientation_matrix
new_orientation_type = current_orientation_type
new_orientation_score = current_orientation_score
54
To Figure 8E
Figure 8D

IMPACT DETECTION SYSTEM FOR VEHICLE

CROSS-REFERENCE TO RELATED APPLICATIONS

This application is National Stage Application of International Application No. PCT/GB2021/053240, filed on Dec. 10, 2021, which claims the benefit of priority from GB Patent Application No. 2019514.5, filed on Dec. 10, 2020, the entire contents of each application is incorporated herein by reference.

TECHNICAL FIELD OF THE INVENTION

The present invention relates generally to the field of vehicle telematics and impact detection. In particular, but not exclusively, the invention concerns an impact detection system for a vehicle.

BACKGROUND TO THE INVENTION

Technologies to measure vehicle dynamics include one or more sensors such as accelerometers and gyroscopes embedded within a telematics control unit within the vehicle. While telematics control units are important and provide rich information to measure vehicle dynamics, they do not necessarily include components or functionality to detect impacts.

A further issue is that not all vehicles are provided with these types of telematics systems. Although they are becoming more common, usually only higher-end vehicles have built in (OEM) telematics systems. These systems usually operate within a proprietary system operated by the vehicle brand.

Aftermarket, battery or self-powered information gathering devices are available. These devices are designed to be affixed to the vehicle by the end-user, and typically include a short-range wireless device for communication between the device and a mobile telephone. These self-powered devices with some form of short-range wireless communication are sometimes called 'tags', 'beacons', or IoT/network-enabled vehicle devices. In their simplest form, these devices help improve the accuracy of the non-deterministic methods to associate mobile telephone data with a known vehicle by broadcasting a unique identifier for the mobile telephone to observe and include as part of the trip information captured by the telephone.

The information is then forwarded to a central server for processing, decision making and storage. The central server may be able to perform more complex analysis on the available information, but the transmission to the central server leads to delays in decision-making as the analysis of the information is performed only after the information has been transmitted to the central server from the vehicle. The central server is also limited in that it can only analyse the information which is provided to it.

Embodiments of the invention seek to at least partially overcome or ameliorate any one or more of the abovementioned disadvantages or provide the consumer with a useful or commercial choice.

SUMMARY OF THE INVENTION

According to a first aspect of the invention there is provided an impact detection system for a vehicle, the system comprising an in-vehicle information capture device for vehicle monitoring having at least one sensor to capture input information in relation to at least one measurable parameter relating to the vehicle; and a mobile computing device operating a software application with an impact detection algorithm to detect an impact based on the information sensed by the in-vehicle information capture device and, when an impact is detected, to push an electronic notification of the impact detection to a third-party system.

Providing an impact detection system for a vehicle to detect a possible impact, determine whether the possible impact is an actual impact and then to push an electronic notification of the impact detection to a third-party system using a mobile computing device allows more efficient identification of an actual impact, which is not reliant on an OEM vehicle telematics system. The system may also report to a central server but the electronic notification of the impact detection to a third-party system preferably issues directly from the vehicle without access to the central server.

The in-vehicle information capture device is typically located in a fixed position within the vehicle. The in-vehicle information capture device is typically located in a fixed orientation within the vehicle.

The in-vehicle information capture device may be provided with at least one internal power supply. The provision of at least one internal power supply will allow the in-vehicle information capture device to be independent of the vehicle power supply. Normally a single power supply is provided although in some conditions a primary power supply and a backup or secondary power supply may be provided. The power supply will typically be or include one or more batteries. Any battery maybe rechargeable in situ. Any battery may be removable and/or replaceable.

The in-vehicle information capture device preferably includes at least one communication device. The in-vehicle information capture device preferably captures telematics information and transmits the captured information to the mobile computing device in the same vehicle. Preferably the at least one communication device is or includes a short-range wireless transceiver. A short-wave wireless transceiver can transmit to the mobile computing device such as a smartphone or tablet or similar, including a telematics module or infotainment system embedded into the vehicle. A smartphone or tablet or similar may process the information thereon and/or may transmit information (raw and/or processed information) to a further remote location or server for example.

Any communication standard may be used including any one or more of Bluetooth®, WiFi®, NFC, radio, optical or similar. More than one communication device may be provided to allow different (and separate) communication pathways to be used for the same device. There may be advantages to providing multiple, independent communication pathways such as separation of captured information from updates or instructions to the in-vehicle information capture device.

The in-vehicle information capture device preferably includes at least one sensor to capture input information in relation to at least one measurable parameter relating to the vehicle. Typically, the in-vehicle information capture device will include a number of sensors, preferably configured to capture different types of information. The information will typically be captured contemporaneously. The advantage of capture of different types of information contemporaneously is that analysis of different types of information captured contemporaneously may reveal more than analysis of a single type of information.

The at least one sensor will normally capture input information at a known frequency. The frequency may be selected for optimum information processing balancing the amount of information to be processed with the speed of processing. For example, information may be captured at one frequency and processed at another frequency. A capture frequency of 100 Hz has been found to be optimum but a higher or lower capture frequency could be selected.

The in-vehicle information capture device may include one or more accelerometer preferably used to detect the orientation of the device. An accelerometer typically measures linear acceleration of movement. A multi-axis accelerometer may be used.

The in-vehicle information capture device may include one or more gyroscope. A gyroscope preferably adds an additional dimension to information supplied by the preferred accelerometer, by tracking rotation or twist. A gyroscope typically measures angular rotational velocity.

An accelerometer will typically measure the directional movement or acceleration of the in-vehicle information capture device but will normally not be able to resolve its lateral orientation or tilt during that movement accurately unless a gyroscope is there to fill in that information.

A multi-axis accelerometer may be combined with a multi-axis gyroscope to provide information in relation to the orientation of the in-vehicle information capture device that is both clean and responsive in the same time.

The in-vehicle information capture device may include one or more vibration sensor to capture information relating to vibrations of the device. Vibrations may be measured in any range including the audible frequency range.

The in-vehicle information capture device may include one or more GPS receivers to capture information in relation to position or location. Position or location information may include speed and/or course information. Whilst these can be derived from position, some GPS chipsets calculate speed from doppler shift much more accurately. If one or more additional sensors are provided, information from one or more of these additional sensors can be utilised to improve the information to be utilised for example correct course information may be corrected using a magnetometer, therefor enhancing the accuracy over solely position or location information.

The mobile computing device will typically be or include a smart phone or tablet or similar device. Such devices normally include an on-board processor, memory and power supply. The on-board processor will typically operate the software application. The on-board processor typically has access to the hardware components of the mobile computing device and can utilise the hardware components of the mobile computing device to implement actions based upon instructions from the software application.

The mobile computing device is typically located within the vehicle. The software application operating on the mobile computing device will typically be initialised each time the mobile computing device comes into range of the in-vehicle information capture device. The mobile device may include one or more sensors to capture information. Examples of the one or more sensors include a GPS receiver, an accelerometer, a gyroscope, a magnetometer, a barometer and the like.

The software application will operate on the mobile computing device but will typically be separate from the mobile computing device operating system. In an embodiment, the software application may include two operating languages and/or a converter to convert between the two operating languages. Portions of the software application will typically be provided in the language of the operating system of the mobile computing device in order to interface with, and typically use, the hardware components of the mobile computing device. Portions of the software application will typically be provided in a secondary language. The secondary language is typically a secondary language chosen to be more appropriate for implementation of the impact detection algorithm models and/or data processing. The secondary language may include a machine learning language, examples of which include TensorFlow and Pytorch, as this will allow utilisation of machine learning to evolve the portions of the software application written in the secondary language.

The software application and/or the detection algorithm may be written in a block format, with at least some blocks written in the secondary language, typically data processing or manipulation blocks, and other blocks such as inputting and/or outputting information or decisions or actions written in the phone software language. One or more conversion blocks may be included to convert between the phone software language and the secondary language.

The software application operating on the mobile computing device will preferably capture input information in one or more datasets. A separate dataset may be maintained or captured for each of the at least one sensor. The in-vehicle information capture device will typically provide at least a portion of the one or more datasets to the software application operating on the mobile computing device. The software application will then typically apply the impact detection algorithm, to make one or more decisions about the occurrence of the possible impact and/or to determine whether the possible impact is an actual impact.

The impact detection algorithm may allow the severity of an actual impact to be determined. The impact detection algorithm typically determines the probability of an impact. The severity may be calculated based on a number of factors such as maximum horizontal magnitude of the impact and duration of the impact.

The software application preferably communicates directly with a third-party system. Third-party systems may include an insurer of the vehicle, emergency responders or even family members of occupants of the vehicle.

The software application will normally apply the impact detection algorithm and, if a possible impact is detected by the software application, may request one or more form of user engagement with the software application in order to confirm that an actual impact has taken place. When a user in the vehicle confirms an actual impact via the software application operating on the mobile computing device, the software application will then push the electronic notification (which may function as a first notice of loss for an insurer for example) directly to the third-party system.

The software application will typically also send information relating to the impact detection and/or classification to a central server for storage and/or further analysis.

Embodiments of the system of the present invention therefore typically allow detection of possible impact, classification of the possible impact as an actual impact or not and requesting of user confirmation of an actual impact, and then notification of third parties directly from the mobile computing device in the vehicle.

The system of the present invention preferably includes a number of components including the in-vehicle information capture device, the mobile computing device operating software application and a central server. One or more communications links are typically provided between the components of the system. At least one communications link is preferably provided between the mobile computing device and the one or more third party systems to allow direct issue of a notification from a mobile computing device to the one or more third party system.

The in-vehicle information capture device typically communicates with or is operatively connected to the mobile computing device (and the software application on the mobile computing device) via Bluetooth.

The in-vehicle information capture device will typically use the communication pathway between it and the mobile computing device to detect when the mobile computing device is present in the vehicle. If the mobile computing device is not present, the in-vehicle information capture device will typically store any captured information at least temporarily on the in-vehicle information capture device until the mobile computing device becomes available. If the mobile computing device is present, the in-vehicle information capture device will typically forward the captured information to the software application on the mobile computing device.

The impact detection algorithm typically operates in the background of the software application, even when the mobile computing device is in a "sleep" mode. The impact detection algorithm will typically be initiated when the in-vehicle information capture device establishes a link with the software application operating on the mobile computing device.

The impact detection algorithm typically operates in real time.

The software application will typically have access to the captured information from the in-vehicle information capture device. The software application may also have access to information from one or more hardware components on the mobile computing device. The impact detection algorithm may utilise the information from one or more hardware components of the mobile computing device but typically, will use the captured information from the in-vehicle information capture device in preference to any other information. As mentioned above, the in-vehicle information capture device will preferably be provided in a fixed location/orientation within the vehicle which will typically lead to more accurate information being captured by the in-vehicle information capture device. However, in an embodiment, the method of the invention will typically ascertain the orientation of the in-vehicle information capture device so, whilst preferable, provision of the in-vehicle information capture device in a fixed location/orientation within the vehicle is not strictly essential.

The in-vehicle information capture device may undertake first instance testing of the captured information to detect a possible impact. The first instance testing of the captured information is typically a very coarse filter. One example of first instance testing may be if an acceleration of more than a predetermined threshold, for example 0.5 g, is experienced for a predetermined period of time, such as for example over 3 to 5 cycles of a 100 Hz information capture. The first instance testing is preferably provided to screen out only instances that are clearly not a possible impact. These may include instances where the captured information shows an acceleration increase which lasts over a period which is clearly too long to be a possible impact for example.

Once a possible impact is detected by the in-vehicle information capture device, the in-vehicle information capture device may flag this possible impact with the impact detection algorithm operating on the mobile computing device.

The impact detection algorithm will then typically identify or locate the possible impact in the one or more datasets of information captured by the in-vehicle information capture device based on the acceleration information. The impact detection algorithm will then typically check the presence of information relating to the possible impact in the one or more datasets. The impact detection algorithm will preferably investigate whether sufficient data exists from before and after the possible impact. The impact detection algorithm may crop the data to centre the data relating to the possible impact for further analysis. Cropping the data will preferably minimise the amount of data to be processed which will preferably in turn decrease latency.

The impact detection algorithm will typically have access to at least one dataset from at least one acceleration sensor such as an accelerometer for example, of the in-vehicle information capture device. The impact detection algorithm will typically have access to at least one dataset from at least one location or position sensor of the in-vehicle information capture device, such as a GPS receiver for example.

The impact detection algorithm may convert any timestamp information in the one or more datasets into actual time for example, seconds or milliseconds.

In relation to the at least one dataset from at least one acceleration sensor, the impact detection algorithm may apply an orientation to the data in the dataset. The impact detection algorithm may check that the orientation on a sample of data from the at least one dataset is correct before proceeding further. The impact detection algorithm will typically calculate the magnitude of the force/acceleration of the possible impact in one or more axes.

At any time, if the impact detection algorithm cannot locate sufficient data for analysis, the detection algorithm will typically stop. If the orientation on the sample of data is incorrect, then the impact detection algorithm will typically stop.

In relation to the at least one dataset from the at least one location or position sensor, the impact detection algorithm will typically locate the possible impact in the location or position dataset. The impact detection algorithm may synchronise the data in the location or position sensor dataset, with the data in the acceleration sensor dataset. The impact detection algorithm will typically calculate any change in course of the vehicle using the data in the location or position sensor dataset at the possible impact. The impact detection algorithm will typically calculate any change in the rate of change in course. The impact detection algorithm may crop the data in the location or position sensor dataset. Typically, any cropping of the one or more datasets will occur after the synchronisation of the datasets.

The impact detection algorithm will typically also check the security of the mounting of the in-vehicle information capture device. The impact detection algorithm may undertake this check using a software model. The software model may include a check of whether the in-vehicle information capture device is completely loose (not mounted in any fixed way within the vehicle) or whether the in-vehicle information capture device is fixed within the vehicle but loosely fixed (as this will affect the accuracy of the information captured by the in-vehicle information capture device). If the impact detection algorithm detects that the in-vehicle information capture device is loose, the impact detection algorithm will typically stop on the basis that the data being used is not sufficiently reliable.

The impact detection algorithm will typically use data from the dataset relating to the at least one acceleration sensor and/or information from the dataset from the at least one locational position sensor (typically data from both) to determine whether the possible impact is an actual impact.

Once the impact detection algorithm has determined that there has been an actual impact, the operation of the software application thereafter is preferably governed by a rules engine.

The impact detection algorithm may also check to see if the orientation before the impact is the same as the orientation after the impact. Typically, data from a time period prior to the impact, for example, the 2 seconds before the impact, is compared with data from a time period after the impact, for example 2 seconds after impact. Usually, if gravity is no longer pointing in the same direction, the vehicle has rolled over. This is an optional feature but provides more information with which to make decisions.

A severity check of the impact may be conducted. The severity check may determine whether the possible impact was at a level above a reporting threshold.

If the possible impact is determined to be at a level above the reporting threshold, the software application operating on the mobile computing device typically issues a push notification to a user requesting acknowledgement of the notification. The notification will typically request acknowledgement within a specific time. The notification may be in the form of a message requesting that the software application operating on the mobile computing device be opened. If no acknowledgement is received from the user within the time allowed, the software application may resend the notification. The resent notification will also include a time period for acknowledgement. If there is still no acknowledgement received from the user within the time period following the resent notification, then the software application may issue a message to an external party requesting that the external party contact the user and/or the vehicle to request acknowledgement.

If acknowledgement is received from the user within one of the time periods, the software application will then typically cause the generation and display of an impact question on the display of the mobile computing device for a user, typically the driver of the vehicle, to answer. The impact question will typically query whether an impact has occurred or not. A response to the impact question will typically be timed. If no response is received within the time, then the software application will typically stop processing. If the user answers "no" to the impact question, this information will be fed back to the rules engine and the rules engine will then typically report this to the central server. If the user answers "yes" to the impact question, the software application will typically check that the mobile computing device has data connectivity and if so, the software application issues the notification directly to the third party.

The rules engine will preferably control interaction with an in-vehicle user post-impact based on information collected from the in-vehicle information capture device, to ensure safe interaction with the user.

The rules engine typically ensures that the message to the user is delivered safely. The rules engine may implement this by checking real-time data available from the at least one sensor to determine if the vehicle is moving or not. This will reduce the possibility that the user is distracted by an alert or bombarded by alerts that could be distracting and in themselves cause an accident.

The rules engine may include rules for analysing customer behaviour post-impact based on information collected from the in-vehicle information capture device, for example are they still driving? are they on a call? The rules engine will normally determine an appropriate period after the impact to minimise distraction to the user. This type of situational awareness would not be possible from a central server-triggered service.

The rules engine may decide what level of probability of a possible impact constitutes an actual impact. Typically, this probability is set to 0.5, but it is typically a configurable parameter that can be set within the rules engine.

The rules engine may apply guidelines to one or more model used. For example, if the model predicts a high probability of an impact, but the data indicates that the acceleration is below the detection threshold, the rules engine will preferably filter this as an unrealistic event. Other guidelines may be used to increase the accuracy of the categorisation of the possible impact as an actual impact or not.

The rules engine may at least partially control the interaction with the user. For example, the rules engine may be configured to request repeated user input or request interaction a certain number of times before deciding to progress to a future action.

As mentioned above, the third party may be an insurer for example or an emergency responder or family member of an occupant of the vehicle. The software application may issue one or more notifications to one or more third parties. The notification(s) may be issued based on the severity of the actual impact. The third parties to whom a notification is issued may be based on the severity of the actual impact.

If the possible impact is detected but the user confirms that an actual impact did not occur, this is typically communicated to the central server.

The software application will typically report information to the central server. The information reported may include all raw information, all transformations applied and all decisions made by the software application operating on the mobile computing device as well as decisions made by and/or inputs from the user.

The mobile computing device typically detects impacts with minimal latency (typically <1 s). The mobile computing device usually also uses local information available to it (such as current speed) to make informed decisions as to when to safely request input from the driver or invalidate false events. For example, input may not be requested if it is determined from the information available to the mobile computing device, that the vehicle is still moving. The mobile computing device will normally log all information, decisions and user inputs. The mobile computing device will normally transmit information to the central server for future evaluation (for example, non-impact, impact overruled by rules engine, impact user confirmed, impact customer rejected, impact no user response).

The central server will normally operate one or more detailed detection algorithm(s) which detect impacts, but may also describe the situation and details of the impact. Some latency is acceptable at the central server level (usually <10 mins) as the notification to the third party has already been made directly from the mobile computing device. The central server usually stores all raw information and all transformations applied and decisions made. The central server may present summary information in a portal to enable third party (for example insurance claims handlers) to understand the situation and enable extraction of detailed information and decisions for court cases and technical reports.

The computer server may use the output of the logged decisions in relation to possible impacts and actual impacts to evolve any one of more of the models or algorithms, particularly the detection algorithm, over time. This evolution is preferably done centrally (at the central server) to ensure that all decisions are consistent across mobile computing devices and/or to ensure appropriate controls and validation of decisions are done before release of any updated to the software application (or parts thereof) operating on the mobile computing device(s). Machine learning may be implemented at the central server to evolve the any one of more of the models or algorithms, particularly the detection algorithm.

The machine learning of the algorithm on the central server and the updates to the impact detection algorithm periodically pushed to the software application operating on the mobile computing device may ensure that the phone is utilising the learning of the algorithm at the central server to ensure consistency of decisions but allowing the software application operating on the mobile computing device to use its more immediate access to more data for detection of an impact as well as reporting to the third party.

DETAILED DESCRIPTION OF THE INVENTION

In order that the invention may be more clearly understood one or more embodiments thereof will now be described, by way of example only, with reference to the accompanying drawings, of which:

FIG. 8B flow diagram of a sixth part of a general system algorithm according to an embodiment.

FIG. 8C is a flow diagram of a seventh part of a general system algorithm according to an embodiment.

FIG. 8D flow diagram of an eighth part of a general system algorithm according to an embodiment.

Figure 8E:
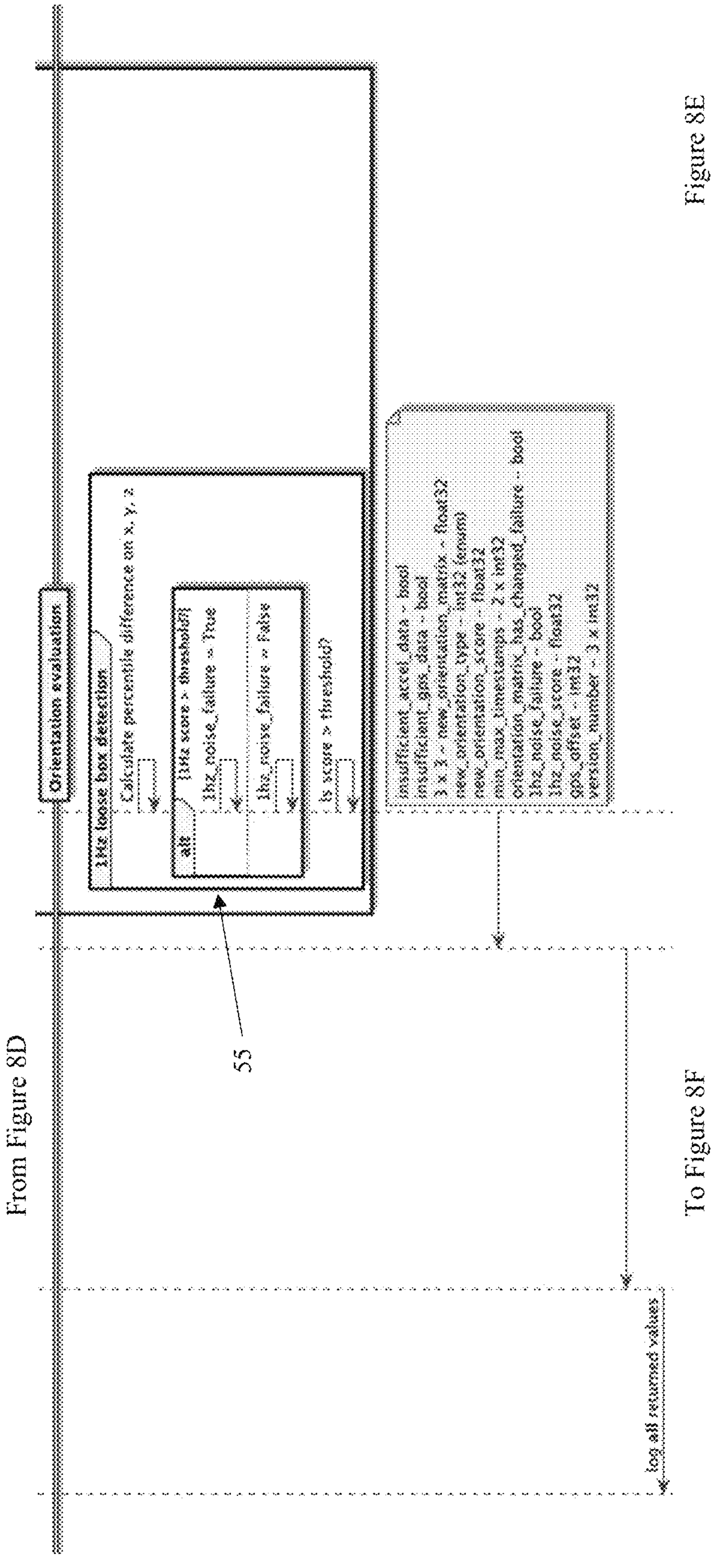
FIG. 8A is a flow diagram of a fifth part of a general system algorithm according to an embodiment.

FIG. 8E is a flow diagram of a nineth part of a general system algorithm according to an embodiment.

Figure 8F:
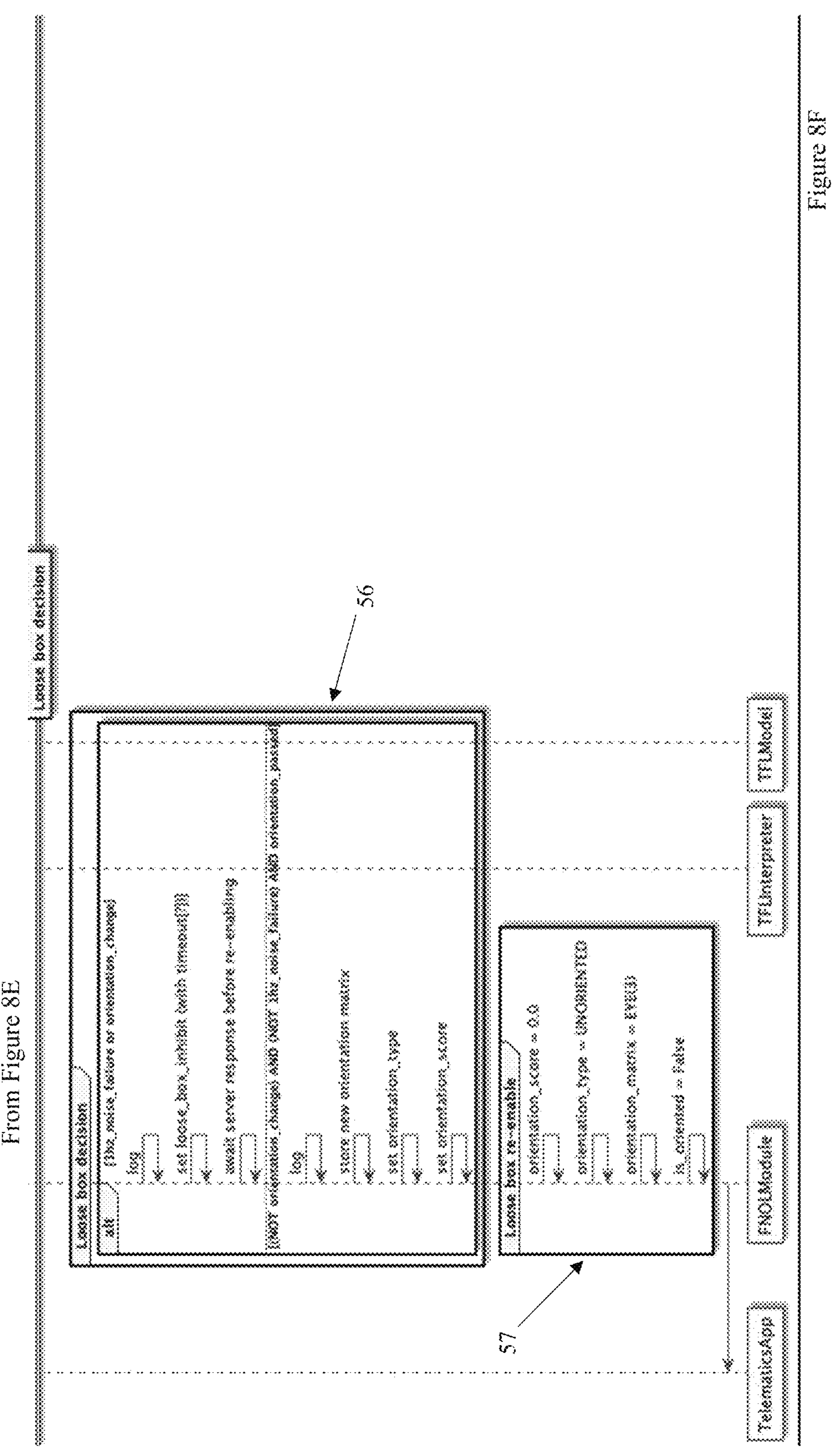

FIG. 8F flow diagram of a tenth part of a general system algorithm according to an embodiment.

With reference to the accompanying figures, an embodiment of a crash detection system and component methodologies therefor, are shown.

Figure 1:
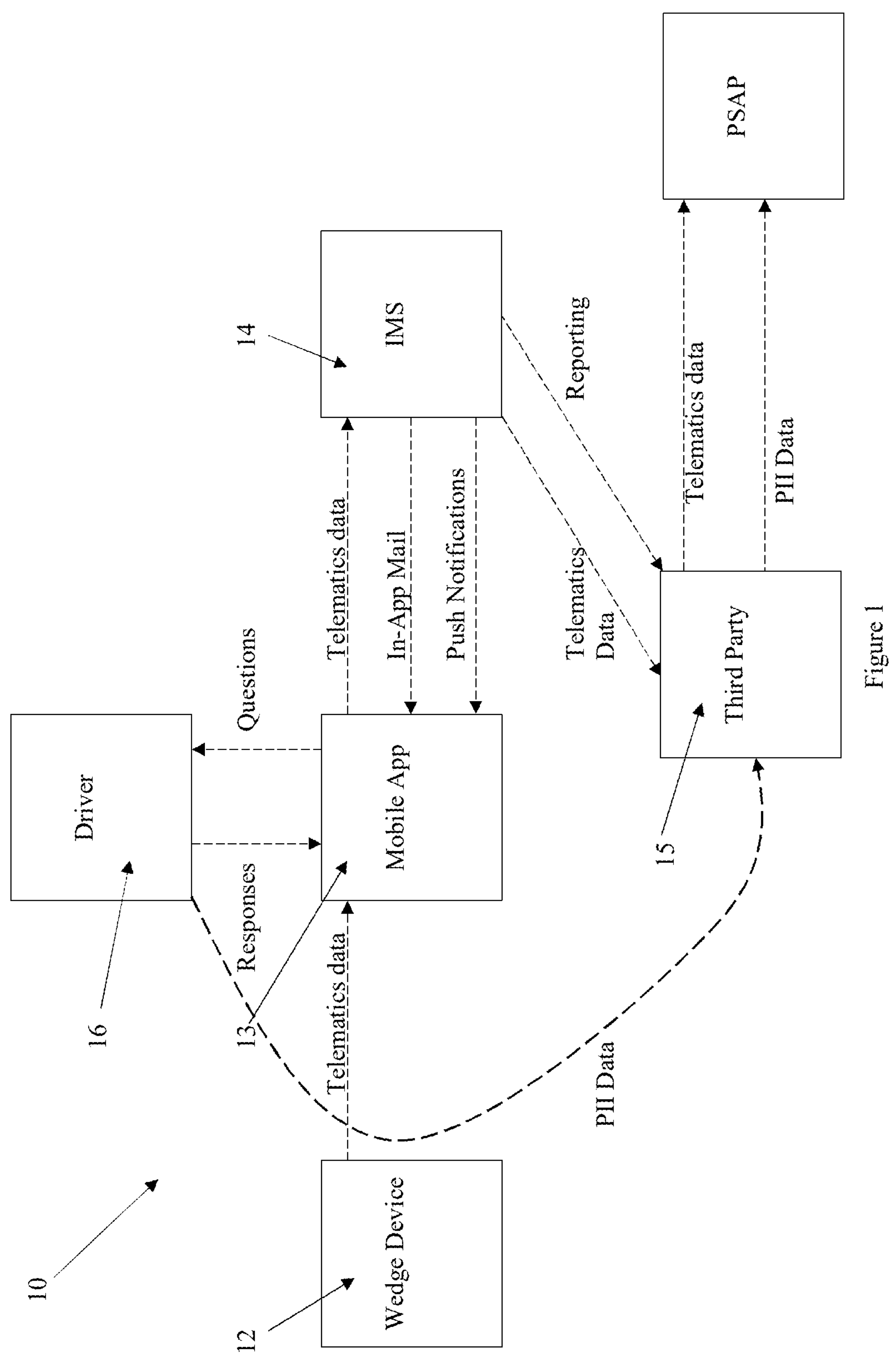
FIG. 1 is a schematic diagram of hardware components of a system of an embodiment.

A general schematic of a crash detection system 10 for a vehicle 11 is illustrated in FIG. 1.

FIG. 1 shows an in-vehicle information capture device 12 which captures telematic information and transmits the captured telematic information to a portable computing device such as a smartphone operating a detection software application 13. The smartphone is normally in the same vehicle as the in-vehicle information capture device 12.

The in-vehicle information capture device 12 and the smartphone are typically connected via a communication standard such as Bluetooth®, WiFi®, NFC, radio, optical or similar.

The in-vehicle information capture device 12 preferably includes a number of different sensors to capture input information in relation to measurable parameters relating to the vehicle. Typically, the device includes a number of sensors configured to capture different types of information. The different types of information will typically be captured from the sensors contemporaneously. The advantage of capture of different types of information contemporaneously is that analysis of different types of information captured contemporaneously may reveal more than analysis of a single type of information.

The in-vehicle information capture device 12 may include one or more accelerometer preferably used to detect the orientation of the device, usually capturing information relating to the linear acceleration of movement.

The in-vehicle information capture device 12 may include one or more gyroscope, to add an additional dimension to information supplied by the preferred accelerometer, by capturing information relating to angular rotational velocity.

The accelerometer will typically measure the directional movement of a device but will normally not be able to resolve its lateral orientation or tilt during that movement accurately unless the gyroscope is there to fill in that information.

A multi-axis accelerometer may be combined with a multi-axis gyroscope to provide information in relation to the orientation of the device that is both clean and responsive in the same time.

The provision of the sensors in the in-vehicle information capture device 12 may allow the in-vehicle information capture device 12 to determine a variety of parameters relating to the vehicle including location, speed or travel but also other information such as the orientation of the vehicle.

The portable computing device or smartphone or tablet or other portable computing device will normally include sufficiently powerful communications components to undertake long range communications. The portable computing device or smartphone or tablet or other portable computing device typically be able to offload data via one or more communications pathways available to it as and when the one or more communications pathways are available. The portable computing device will normally include a short-range wireless transceiver (this may be the same transceiver as the long-range transceiver or a separate unit). The portable computing device or smartphone or tablet or other portable computing device can select between the one or more communications pathways available to it.

Typically, the portable computing device may include at least one on-board accelerometer. Typically, the portable computing device may include at least one on-board gyroscope. Typically, the portable computing device may include at least one on-board magnetometer. Typically, the portable computing device may include at least one barometer. Typically, the portable computing device may include at least one on-board navigation component/system. Normally, a smartphone or tablet, for example, will include a Global Navigation Satellite System (GNSS) component. However, these sensors, when provided on a smartphone or tablet for example, do not always capture information reliably, and usually, any one or more of the sensors identified, may typically be provided in the in-vehicle information capture device.

Typically, the portable computing device may include at least one on-board storage component. Preferably the at least one storage component will be or include electronic storage. The electronic storage will typically be non-volatile storage.

Typically, the portable computing device may include at least one on-board long-range wireless transceiver. The long-range wireless transceiver may be configured to send and receive information to and from an associated short-range transceiver, such as from the device. The long-range wireless transceiver may be configured to send and receive information to and from an associated remote location.

In an embodiment, the smartphone therefore has access not only to the telematics data collected by the in-vehicle information capture device 12, but also to information from hardware components of the smartphone itself.

The software application operating on the smartphone typically uses data available to it, to undertake impact or collision monitoring and make decisions on when an impact or collision has been detected. The software application operating on the smartphone will normally issue questions or notifications to the driver of the vehicle and receive a response to any questions or notifications. The software application operating on the smartphone will also make decisions based on the driver's answer(s) (or non-answers) and if an impact is detected by the software application operating on the smartphone and confirmed by the driver, the software application operating on the smartphone will typically confirm this with at least one third-party.

The software application operating on the smartphone will typically also provide information regarding decisions and/or events to a server software application operating on a central computer system or network 14.

The server software application operating on a central computer system or network 14 may undertake more detailed analysis of the information and/or decision and may report separately to the at least one third-party.

Figure 3A:
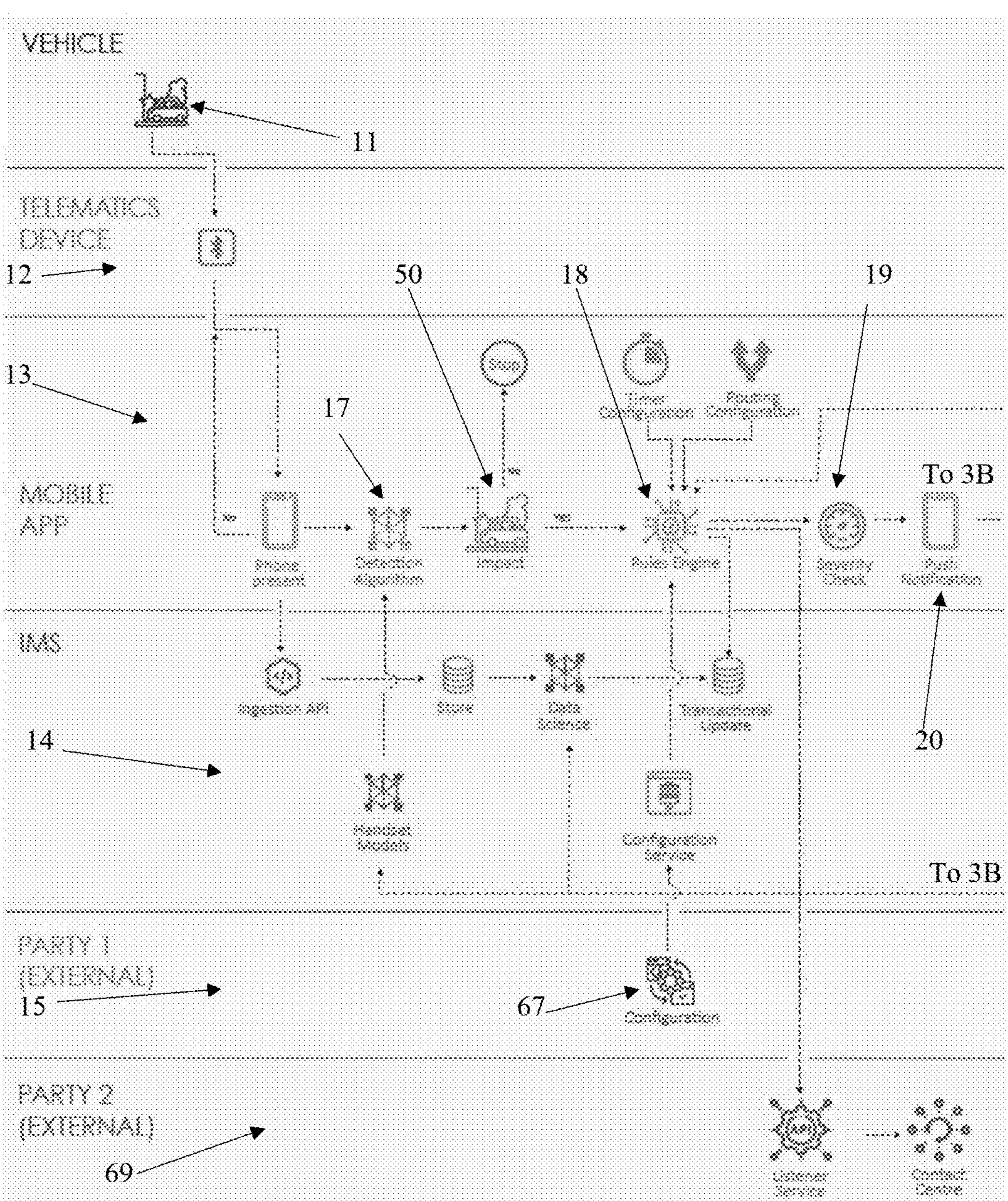
FIG. 3A is a schematic diagram showing a first part of a division of functionality between hardware components of a system of an embodiment.
Figure 3B:
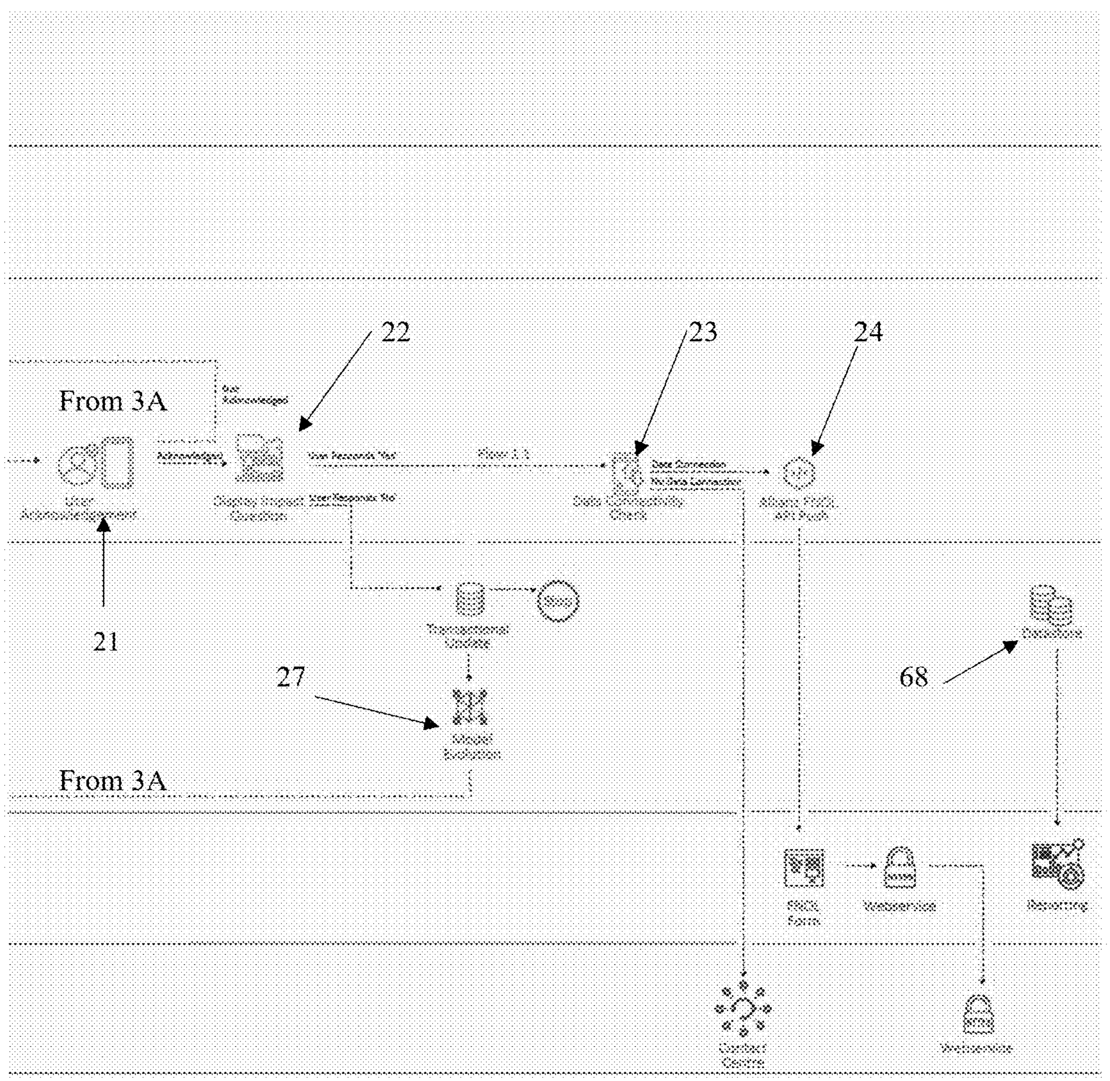
FIG. 3B is a schematic diagram showing a second part of a division of functionality between hardware components of a system of an embodiment.
Figure 4A:
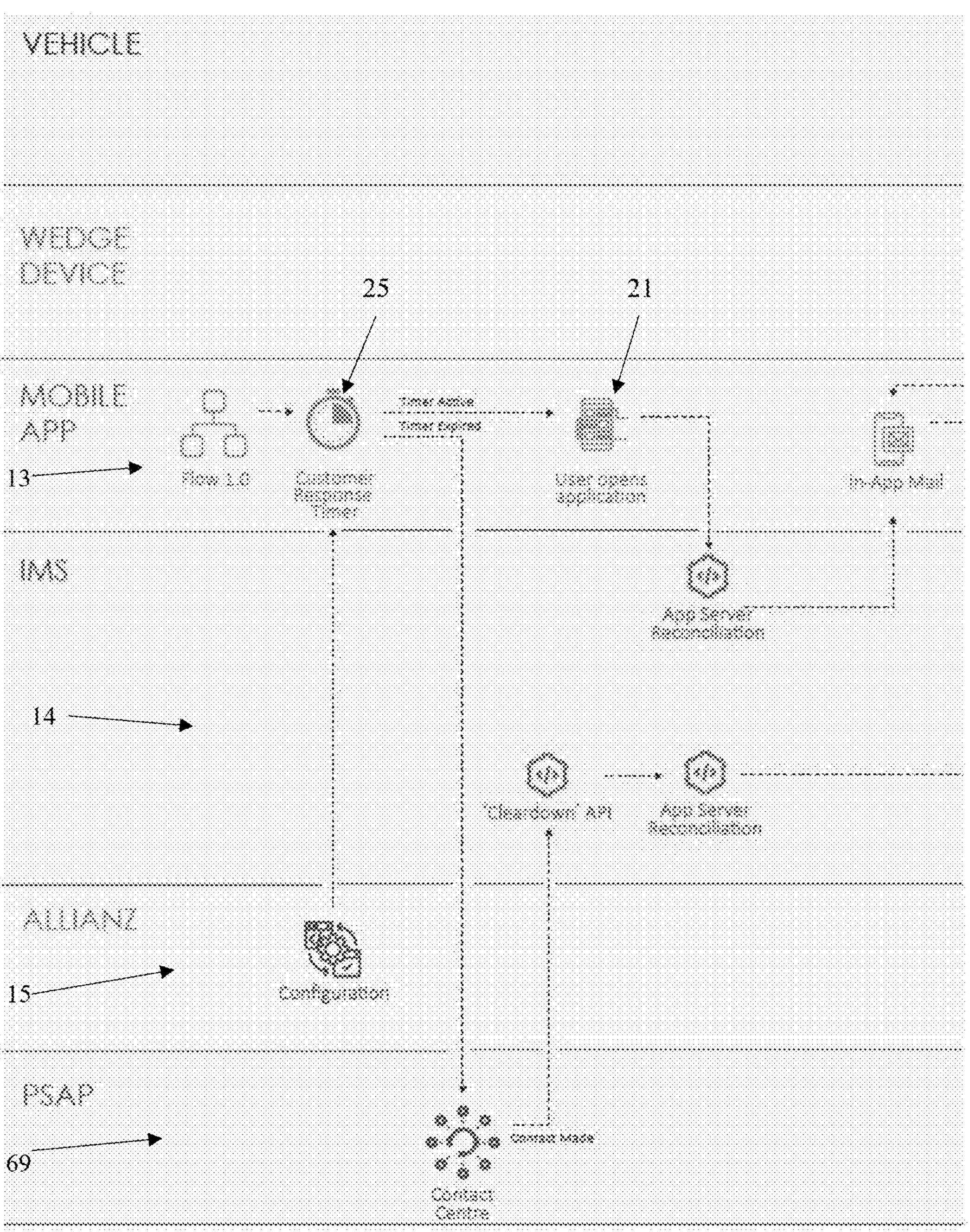
FIG. 4A is a schematic diagram showing a first part of a division of functionality between hardware components of a system of the embodiment illustrated in FIGS. 3A-3B.
Figure 4B:
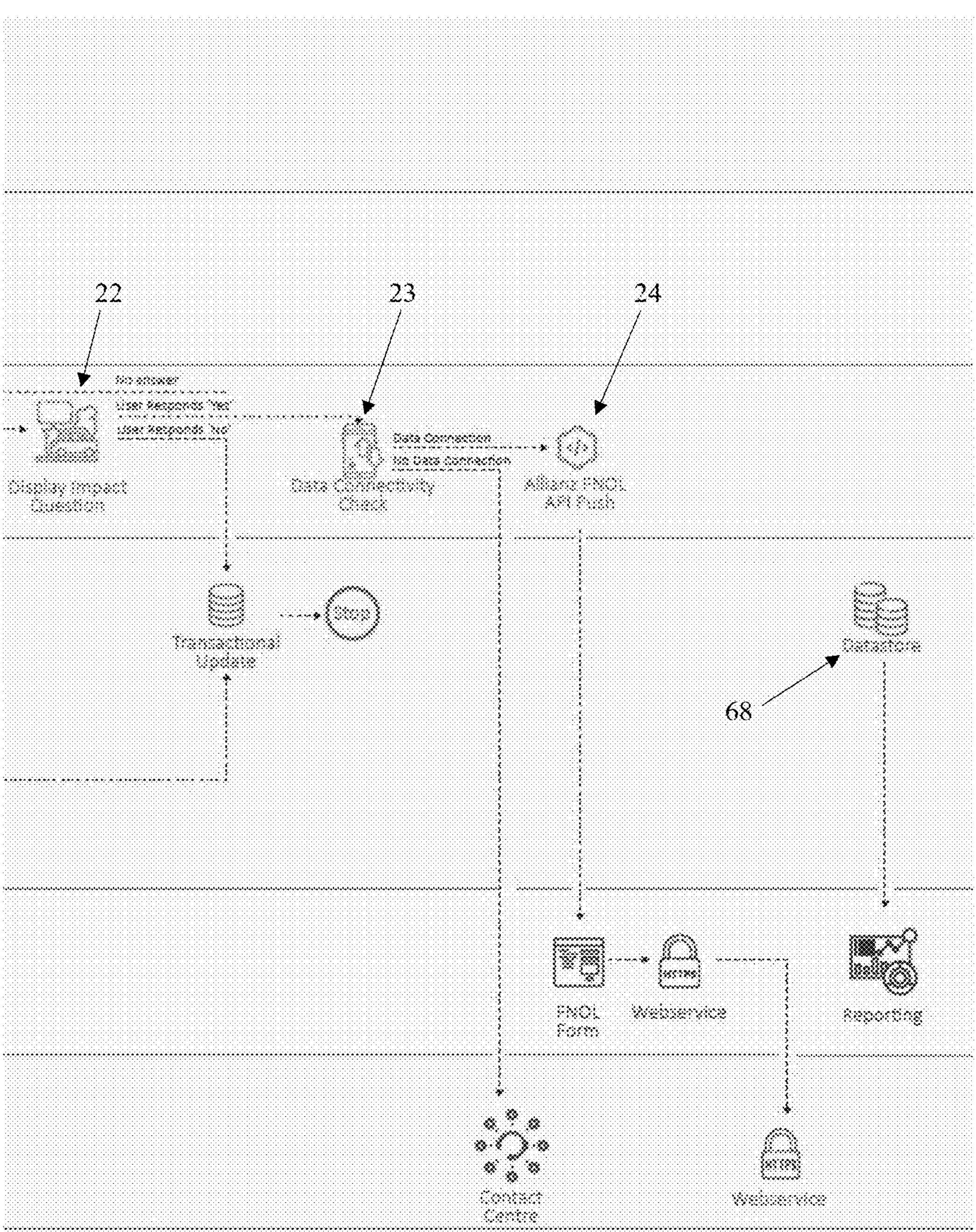
FIG. 4B is a schematic diagram showing a second part of a division of functionality between hardware components of a system of the embodiment illustrated in FIGS. 3A-3B.

As illustrated in FIGS. 3 and 4, the in-vehicle information capture device 12 will typically undertake an initialisation protocol according to which the in-vehicle information capture device 12 checks whether the smartphone is present or not. This may occur directly or indirectly. The initialisation protocol may be triggered when a smartphone with a communications pathway, such as Bluetooth® for example, enters into a specified proximity of the in-vehicle information capture device 12.

If a smartphone operating the detection software application is detected, the in-vehicle information capture device 12 will transmit the captured information to the smartphone. If a smartphone operating the detection software application is not detected, then the in-vehicle information capture device 12 will normally temporarily store the captured information in onboard memory until an appropriate download or transmission can be made.

The smartphone will typically utilise the telematic information that is provided by the in-vehicle information capture device 12 to detect the occurrence of a collision or impact. The smartphone will preferably undertake this detection according to a detection algorithm in the detection software application.

Once a collision or impact is detected by the detection algorithm 17 operating on the smartphone, the detection software application 17 will then typically undertake a further assessment of the detected collision or impact 50 and take action based on that further assessment.

The further assessment is preferably governed by a rules engine 18. The rules engine 18 will normally have access to various types of information/inputs including the telematic data upon which the collision or impact is detected. The rules engine 18 may utilise information from a timer. The rules engine 8 may utilise routing information in relation to a vehicle route. The rules engine 18 will preferably undertake a severity check 19 of the collision or impact detected utilising information available to the rules engine 18.

If the severity of the impact is above a threshold (some impacts may be relatively minor), the software application operating on the smartphone will preferably cause a request for acknowledgement message (push notification) 20 to be issued to the driver 16 of the vehicle. The purpose of the request for acknowledgement message is to enable the system to recognise whether the driver 16 has access to the smartphone after the collision or impact has occurred which may not be the case if the driver 16 is unconscious or the smartphone is out of reach for example. If the driver 16 does not acknowledge the message, then the software application may be capable of issuing notifications to one or more third parties 69 possibly regarding the location of the vehicle (as the smartphone will have access to position information), the status of the vehicle or the like, possibly to emergency responders or to a listening service.

When the driver 16 acknowledges (at step 21) which may be by the driver opening the software application as shown in FIG. 4, the software application operating on the smartphone may then request confirmation that a collision or impact has occurred.

As shown in FIG. 4, there will normally be a timer applied to the confirmation that a collision or impact has occurred. The length of the time available may be defined by a third party, such as an insurer for example. If the time period expires without the driver responding, the software application operating on the smartphone may contact a third party, such as a contact centre to request that the contact centre make contact with the driver.

If the driver responds 21 (this may occur in any way, such as, for example, by the driver opening the software application operating in the background of the smartphone) while the time period is still active, the impact question may be displayed 22, querying whether an impact has occurred.

If the driver 16 responds in the positive (to indicate that a collision or impact has occurred) then the software application operating on the smartphone will preferably check that it has data connectivity 23 and if it does, the smartphone will preferably report 24 the collision or impact to a third-party computer server or network 15.

If the driver responds in the negative (to indicate that a collision or impact has not occurred) then the software application operating on the smartphone will preferably end the process and report to a central computer server or network 14.

If no response is received, then the software application operating on the smartphone may again request confirmation that a collision or impact has occurred.

The third party 15 may be or include an insurer. In this way, once an impact or collision is detected, the incident can be analysed based on the telematics information collected by the in-vehicle information capture device 12 (and any other information that the software application has access to) and reported immediately. Preferably, the incident is also reported to the central computer server or network 14 of the system.

The impact detection decision is preferably made by the software application operating on the smartphone and if an impact is detected, the software application operating on the smartphone may then request confirmation that a collision or impact has occurred from a user (typically the driver) and once confirmation is received, the software application operating on the smartphone may then notify at least one third party 15 such as an insurer directly.

The smartphone operating the detection software application is typically connected via an appropriate communication standard to a central computer server or network 14. The smartphone will typically transmit information to the central computer server or network 14 and receive information from the central computer server or network 14.

In particular, the central computer server or network will preferably store the information transferred from the detection software application. The central computer server or network will also typically configure the impact detection algorithm and provide updates to a detection algorithm to the smartphone. Any evolution 27 of the impact detection algorithm or part thereof, may be accomplished using machine learning.

The central computer server or network will typically be associated with a datastore 68 for storing the data from the system. This data includes information sent to the central computer server or network 14 from the in-vehicle information capture device 12 as well as information produced by the server software application operating on the central computer server or network 14.

The central computer server or network may also be configured to allow configuration information 67 to be provided to the server software application from third party systems 15. This may be particularly useful where a third-party system 15 such as a vehicle insurer for example, wishes to define one or more parameters to take into account when determining what severity of collision or impact should be reported. This information may be provided from the third-party system to a configuration service in the server software application operating on the central computer server or network, and from there, to the rules engine in the detection software application operating on the smartphone.

The server software application operating on the central computer server or network 14 may contain more advanced analytics than the detection software application operating on the smartphone. The detection software application operating on the smartphone is preferably able to arrive an impact or collision detection decision more quickly as it is in the vehicle. The detection software application operating on the smartphone will also usually have more immediate access to more information upon which to base the decision. All of the information upon which a decision is made is generally also transmitted to the server software application operating on the central computer server or network for more in-depth analysis and/or event reconstruction.

The server software application operating on the central computer server or network 14 will typically also be provided with the information upon which a positive impact or collision detection decision is made and this information may be used to evolve the detection algorithm. This step is preferably independent of the notification to the at least one third party, that is a positive impact or collision detection decision is typically notified directly to the at least one third party from the smartphone.

Preferably, evolution 27 of the impact detection algorithm or any part thereof, which is a part of the detection software application on the smartphone, will take place primarily in the server software application operating on the central computer server or network 14. An updated detection algorithm can then be pushed out to the detection software application on the smartphone as illustrated in FIG. 3. This will preferably allow the server software application operating on the central computer server or network to maintain transparency and consistency in operation of the detection algorithm whilst also maintaining central control. The periodic updates of the detection algorithm from the server software application operating on the central computer server or network also mean that the detection algorithm can operate autonomously as required but any updates are centrally controlled by the server software application operating on the central computer server or network. Any update which takes place is fully controlled by the central computer server or network. The exact set of models in the software application on the smartphone is configurable down to the specific device and/or customer.

The server software application operating on the central computer server or network 14 will preferably utilise machine learning to evolve the impact detection algorithm or any part thereof.

The machine learning of the more complex algorithm of the server software application operating on the central computer server or network 14 and the updates to the detection algorithm operating on the smartphone periodically pushed to the smartphone ensure that the smartphone is utilising the learning of the more complex algorithm to ensure consistency of decisions but allowing the smartphone to use its more immediate access to more data for detection as well as reporting to the third party.

The smartphone operating the detection software application may also be connected via an appropriate communication standard to one or more third parties or third-party systems. The smartphone operating the detection software application may interface directly with a third-party system.

Figure 7A:
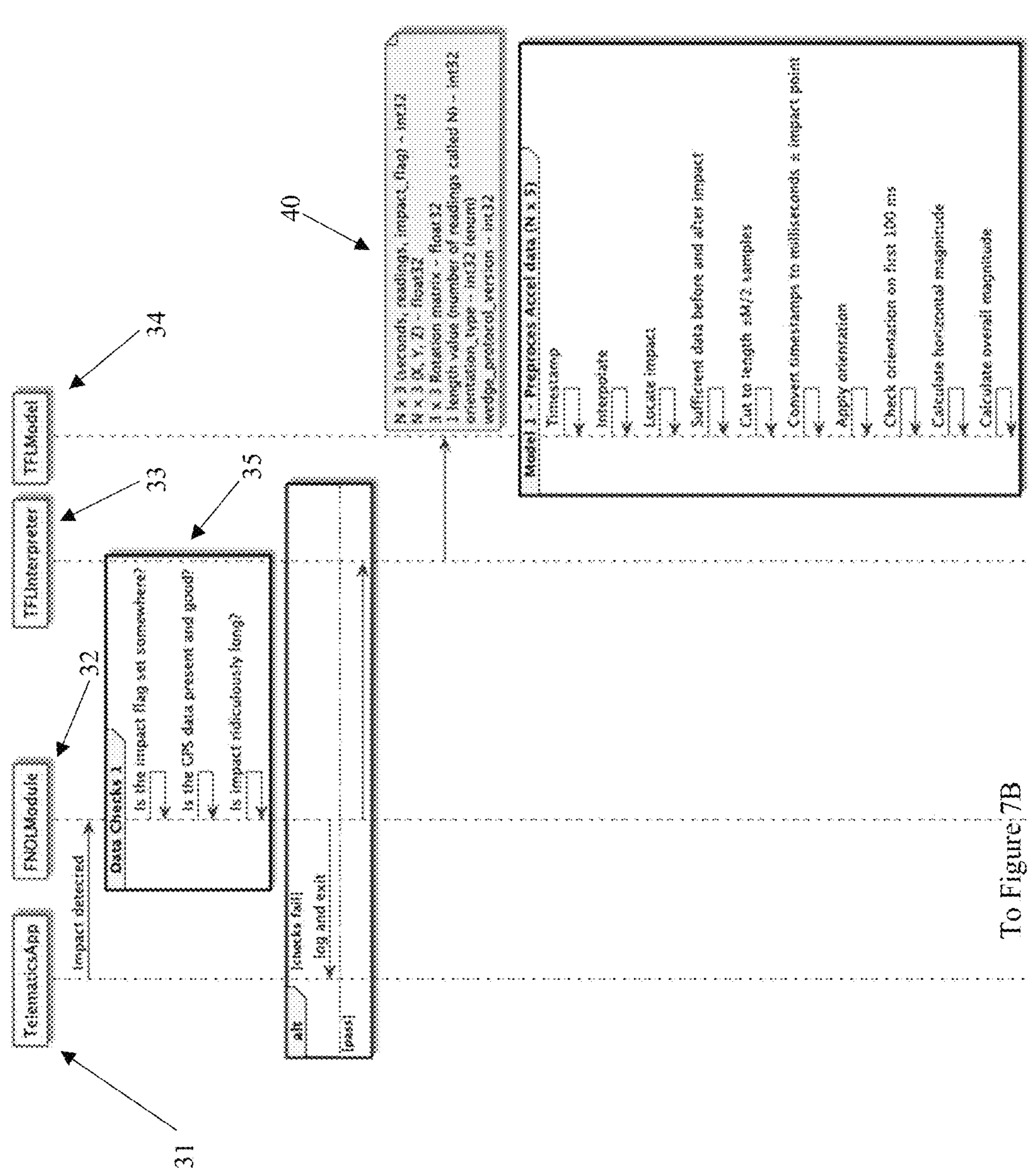
FIG. 7A is a flow diagram of a first part of a general system algorithm according to an embodiment.
Figure 7B:
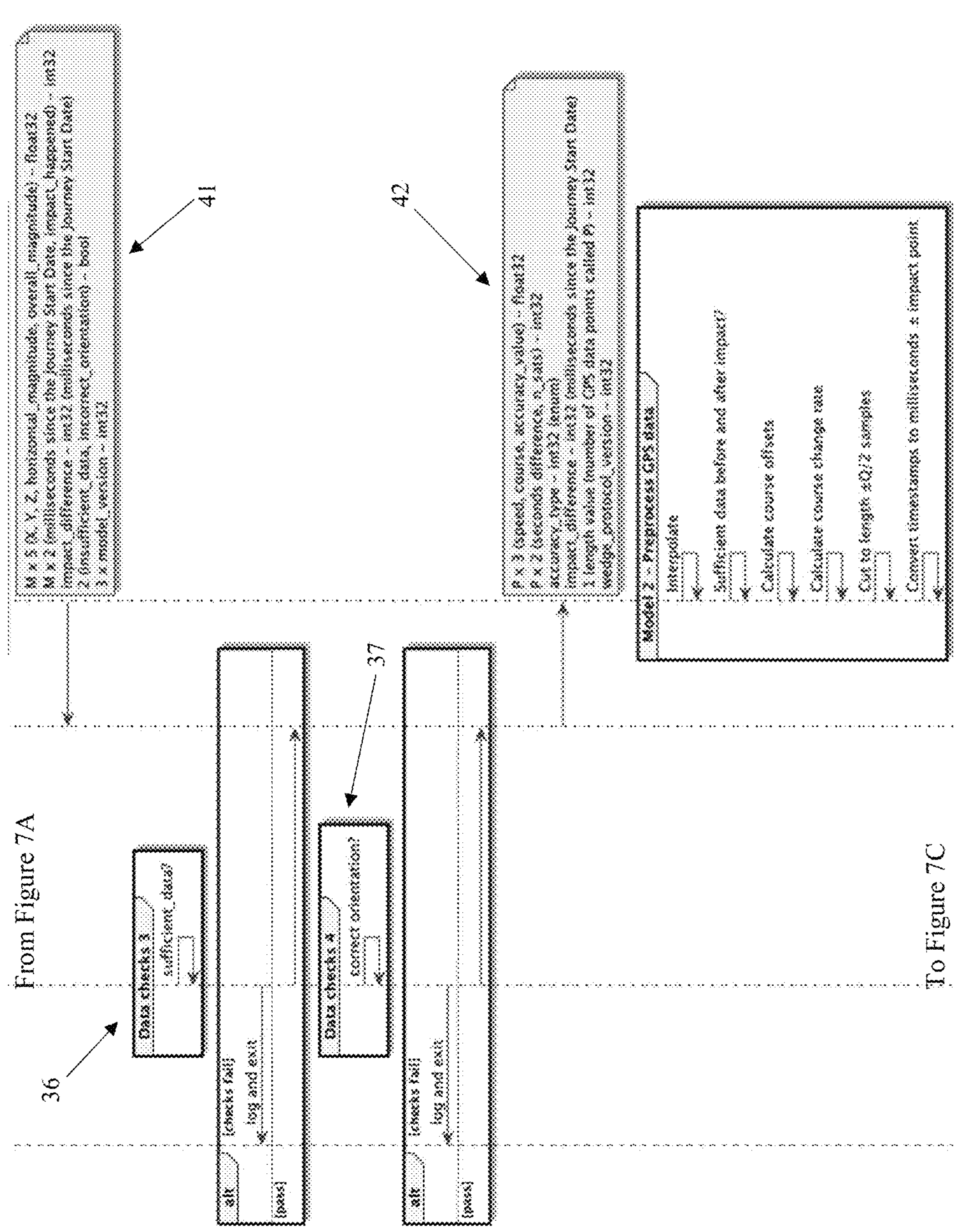
FIG. 7B is a flow diagram of a second part of a general system algorithm according to an embodiment.
Figure 7C:
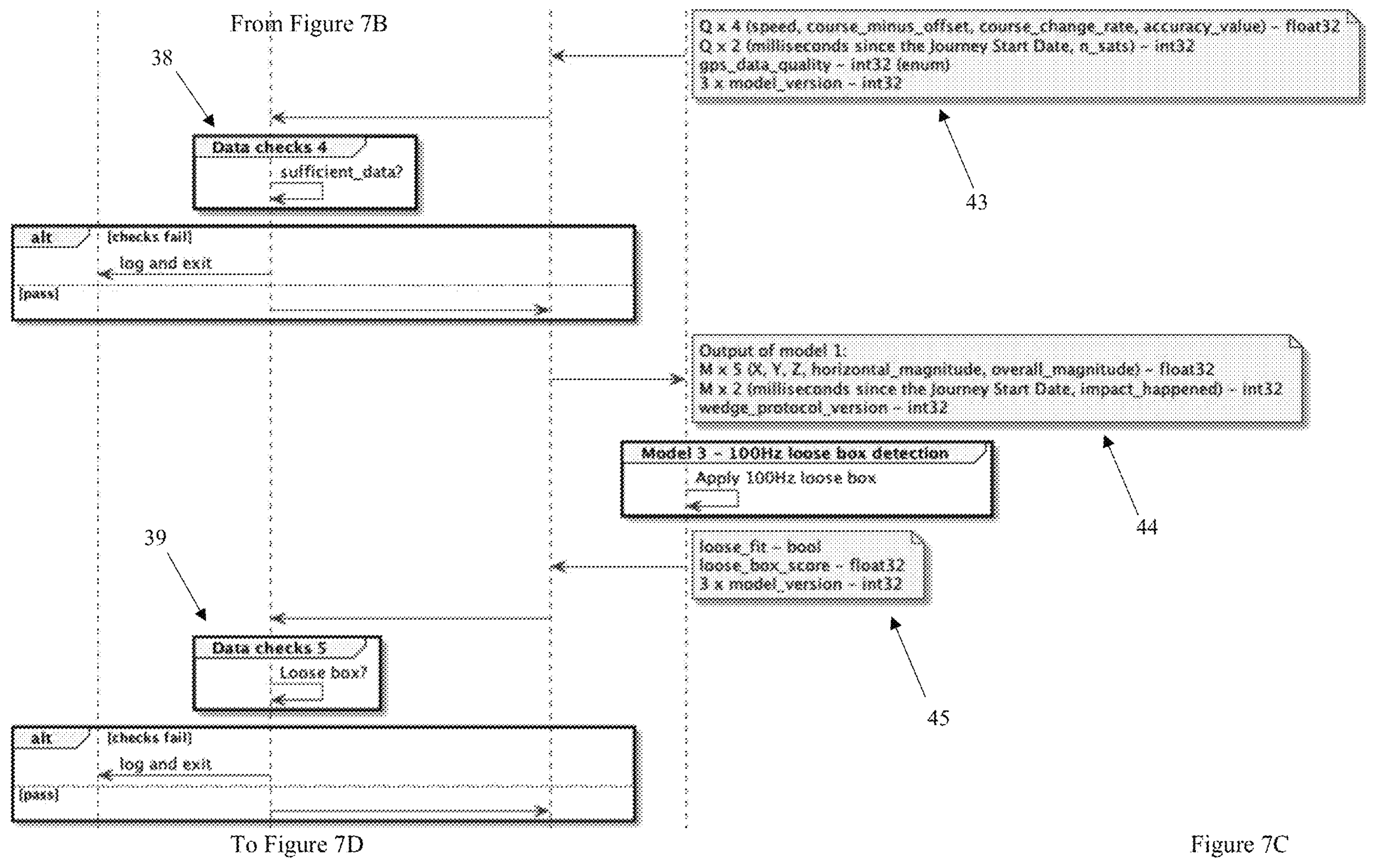
FIG. 7C is a flow diagram of a third part of a general system algorithm according to an embodiment.
Figure 7D:
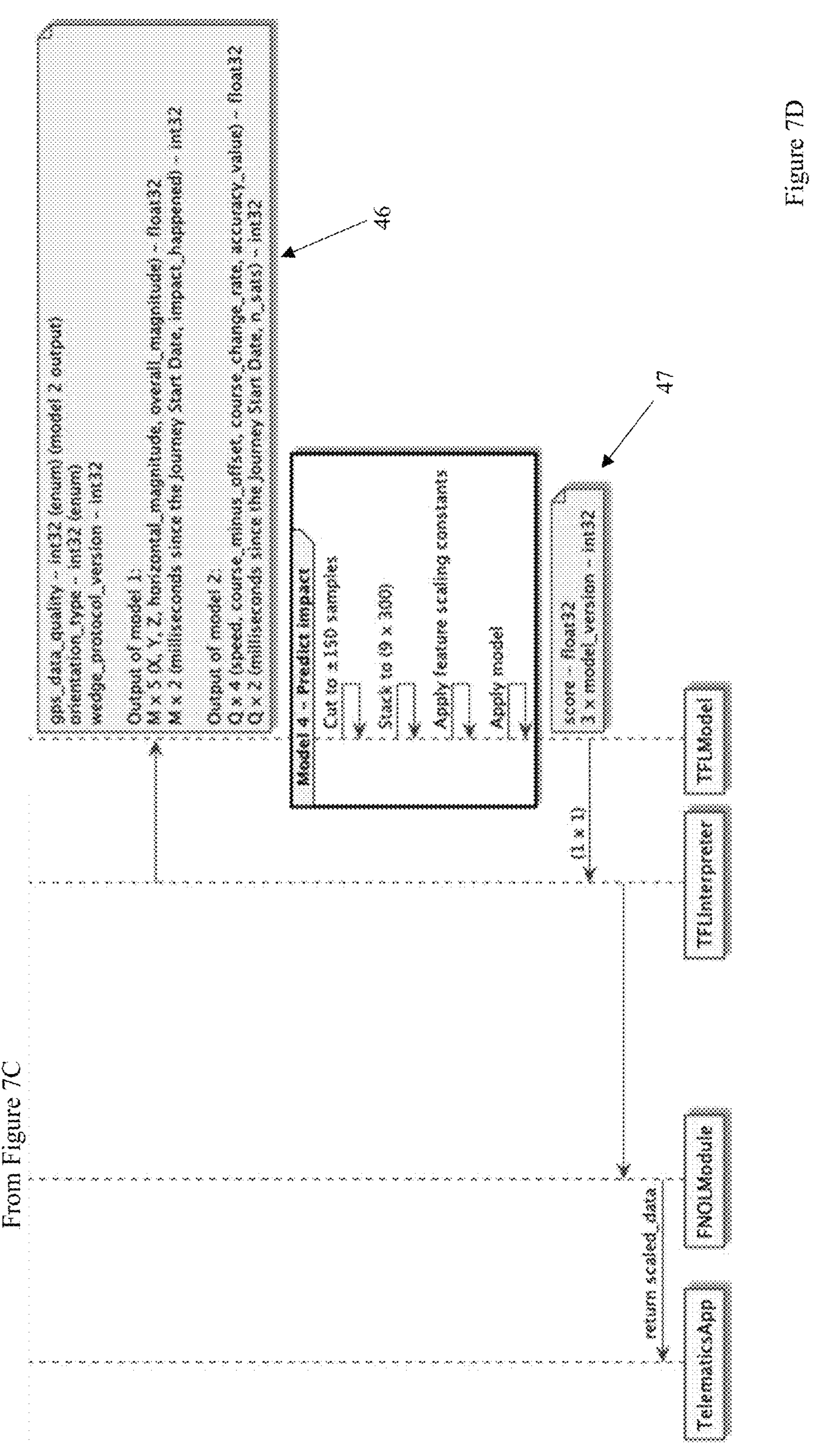
FIG. 7D is a flow diagram of a fourth part of a general system algorithm according to an embodiment.

The software application operating on the smartphone may operate according to the general system algorithm illustrated in FIGS. 7A and 7B. The general algorithm illustrated is divided across four flow paths, one flow path 31 representing interactions with the in-vehicle information capture device 12, one flow path 32 representing processes undertaken in the operating language of the smartphone, one flow path 33 representing processes which are converted from the operating language of the portable computing device to a secondary language and one flow path 34 representing processes undertaken in the secondary language.

This form of the software application makes use of two different software languages and swaps functions between the two languages allowing interaction with the driver and the third party to be undertaken in the operating language of the smartphone, but to allow a secondary language to be used for the processing of the information. The secondary language is one which has been selected to provide better functionality for the different processing models within the general system algorithm.

As illustrated in FIGS. 7A to 8B, the general system algorithm is written in a series of blocks which occur in one or more of the flow paths. Generally speaking, data checks and reporting occur in the first, second or third flow path and the system models occur in the fourth flow path in the secondary language.

Operating the algorithm in the blocks as illustrated allows one or more of the blocks to be updated without updating the entire algorithm each time an update is made. It also makes jobs such as trouble shooting or debugging more straightforward as each block can be treated as an independent portion of the algorithm.

The data checks at the various stages in the algorithm are typically checking to see whether any required inputs are present and/or whether the output from one or more of the models meets the baseline condition being checked. For example, 'Data Check 1' 35 is the algorithm checking whether the impact flag is actually set within the system, whether GPS data is present and being delivered as required, and checks the length of the data. A threshold such as approximately 20 seconds may be used, as there may be back-to-back impacts from a multi-vehicle incident for example. Typically, an amount of data, usually more than 5 second and preferably more than 8 seconds of data, will be present for analysis as data is normally collected from before and after the impact for context. 'Data Check 3' 36 in FIG. 7A is the algorithm checking whether sufficient data is present for the algorithm to operate as required. 'Data Check 4' 37 in FIG. 7A is the algorithm checking to see whether the orientation of the in-vehicle information capture device 12 is correct to ensure that the data is interpreted correctly. 'Data Check 4' 38 in FIG. 7*b* is the algorithm checking whether sufficient data is present for the algorithm to operate as required. 'Data Check 5' 39 in FIG. 7B is the algorithm checking whether the output from Model 3 indicates that the in-vehicle information capture device 12 ('the box') is loose. At each data check, if the check is failed, then the algorithm logs the failure and exits. If the data check is passed, then the algorithm proceeds to the next block or model.

As mentioned above, each of the models used in the algorithm illustrated in FIGS. 7A to 8B are in a secondary language which is more appropriate for the calculations/testing undertaken than the language of the smartphone. The secondary language may be a more powerful processing language or not.

Box 40 shows the input data into Model 1.

Model 1 shown in FIG. 7A relates to the pre-processing of data from the accelerometer. This model locates the impact in the accelerometer data and then checks whether there is sufficient data available from before and after the impact. The model then crops the dataset around the impact which in turn allows a minimisation of the use of computing resources. The model converts the timestamp data into milliseconds to give a more realistic concept of time relative to the dataset. The model then checks whether the orientation of the in-vehicle information capture device 12 ('the box'). The model then checks whether the orientation information on the data is correct. The model then calculates the magnitude of the acceleration in at least two axes (normally these two axes will be the X-axis and the Y-axis).

Box 41 shows the output data from Model 1.

Box 42 shows the input data into Model 2.

Model 2 relates to the pre-processing of data from the location device, in this case, a GPS receiver. This model locates the impact in the accelerometer data and then checks whether there is sufficient data available from before and after the impact. The model then calculates the course of the vehicle from the data and calculates the rate of change in the course. The model then crops the dataset around the impact which in turn allows a minimisation of the use of computing resources. The model converts the timestamp data into milliseconds to give a more realistic concept of time relative to the dataset.

Box 43 shows the output data from Model 2.

Box 44 shows the input data into Model 3 (which is the output from Model 1).

Figures 5A, 5B, 5C:
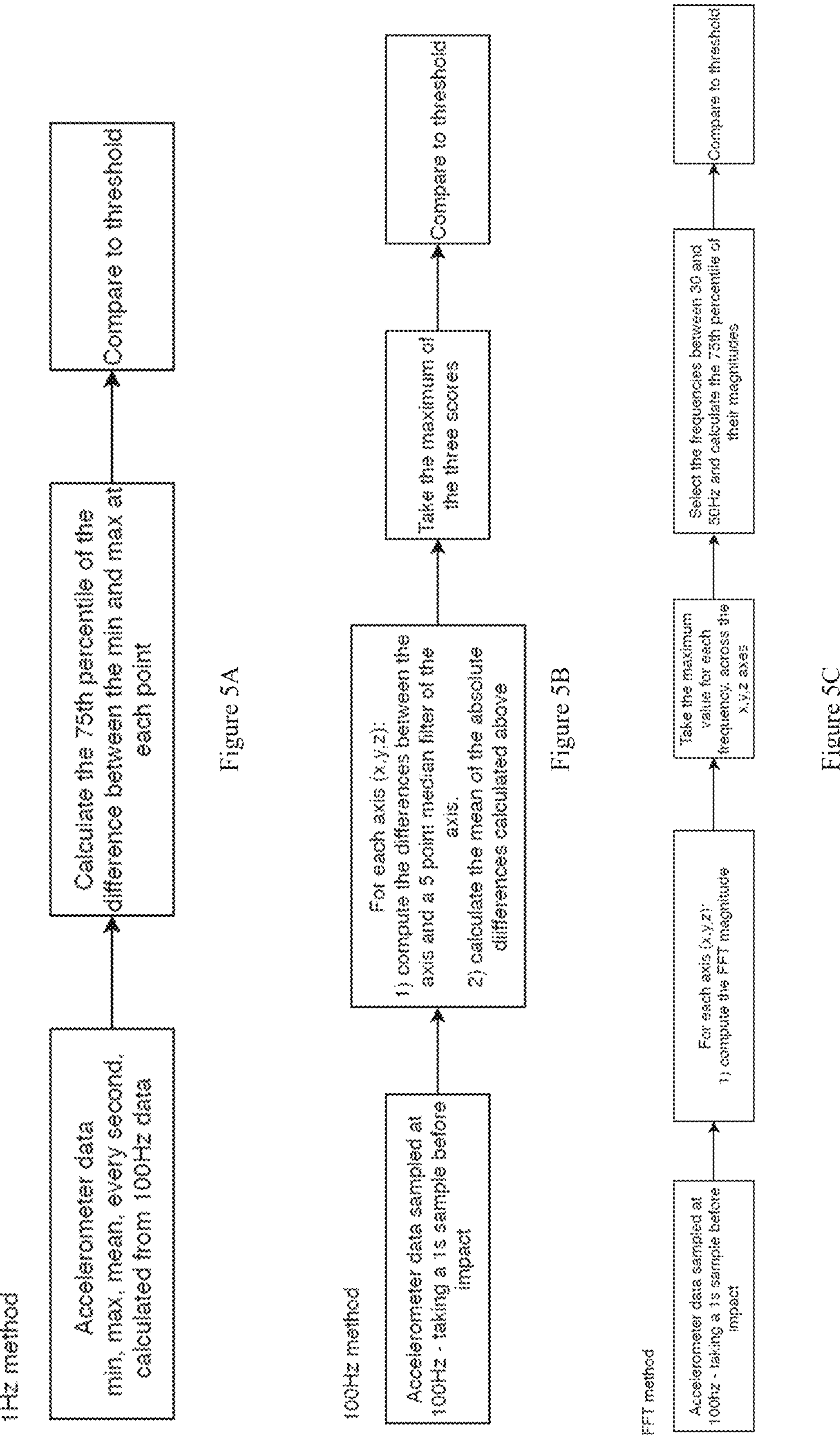
FIG. 5A is a flow diagram showing a first mount security detection method according to an embodiment.
FIG. 5B is a flow diagram showing a second mount security detection method according to an embodiment.
FIG. 5C is a flow diagram showing a third mount security detection method according to an embodiment.

Model 3 in FIG. 7B uses the 100 Hz loose box detection algorithm illustrated in FIG. 5B but may be undertaken using any one or more of the methods shown in FIGS. 5A to 6C.

Box 45 shows the output data from Model 3.

Box 46 shows the input data into Model 4 (which is the output from Model 1 and output from Model 2).

Model 4 relates to the determination of the impact itself. Typically, this takes place utilising a portion of the information available (±150 samples in this example). Model 4 also preferably utilises a synchronisation of data from an accelerometer and positioning data such as that which may be gained from a GPS receiver, to ensure that the datasets from the respective components is aligned. A process such as that illustrated in FIG. 2 could be used.

Box 47 shows the output data from Model 4.

FIGS. 8A and 8B illustrate an algorithm undertaken after a journey has ended. As illustrated, the software application loads the data up until the journey has ended. Box 48 shows an example of the inputs to Model 5.

Model 5 as illustrated includes at least one determination or orientation and at least one loose box test. This embodiment undertakes a determination of partial orientation with respect to gravity (Box 49) and then once the partial orientation has been completed, undertakes a full orientation determination (Box 50). The full orientation determination illustrated includes a calculation of GPS clock skew (Box 51) followed by a yaw calculation (Box 52). Once that has been completed, an orientation score can be calculated and compared to the threshold (Box 53).

The orientation matrix is then checked and updated if it has changed (Box 54) as shown in FIG. 8B.

A 1 Hz loose box detection subroutine (one form is illustrated in FIG. 5A but it is important to recognize that the $75^{th}$ percentile may differ as required, that is a different percentile may be calculated) is then undertaken (Box 55).

The algorithm illustrated in FIG. 8B also includes a loose box decision subroutine in which the new orientation matrix and orientation score is set (Box 56). A loose box re-enable (Box 57) is then undertaken to prepare the application for the next journey.

Figure 2:
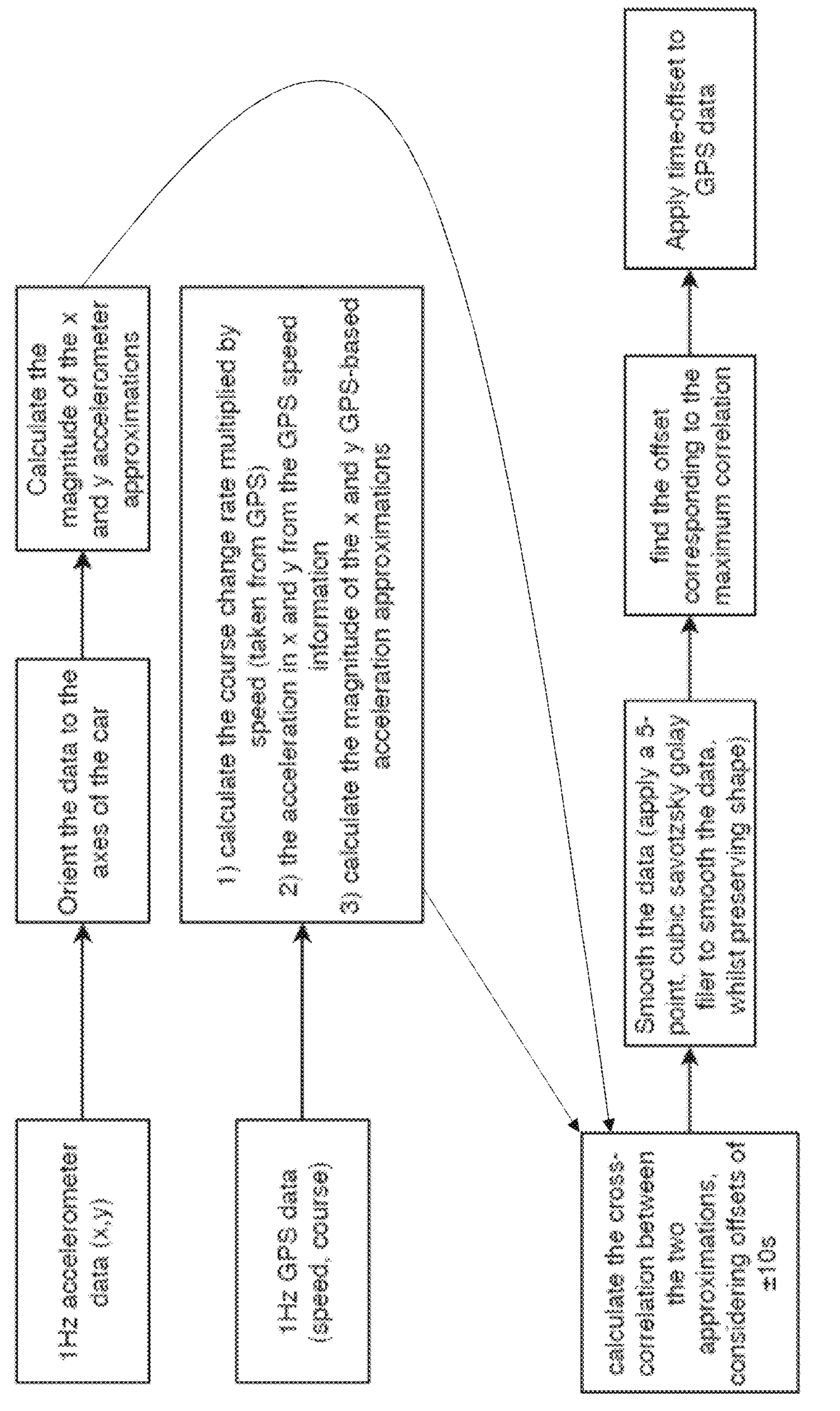
FIG. 2 is a flow diagram showing a synchronisation methodology according to an embodiment.

As illustrated in FIG. 2, the method of correcting for synchronising a dataset of data from at least one first sensor using data from at least one second sensor comprises collecting first data in a first data set over a time period, t, collecting second data in a second data set over a time period, t, calculating a magnitude of at least one parameter from the first data set, calculating a magnitude of at least one parameter from the second data set, calculating a cross correlation between the respective magnitudes of at least one parameter from the first data set and the second data set, identifying a synchronisation time offset corresponding to a maximum correlation between the respective magnitudes of at least one parameter from the first data set and the second data set, and applying the synchronisation time offset to the second data set to synchronise the second data set with the first data set.

In the illustrated embedment, the at least one first sensor is an acceleration sensor and the second sensor is a position sensor with the at least one parameter used as the basis for the correlation being acceleration.

In an embodiment, the data is collected at a frequency of 100 Hz. The data may be processed using this frequency. A lesser (or greater) frequency may be used to reduce the amount of processing required. For example, the data may be collected at a frequency of 100 Hz but processed at a frequency of 1 Hz.

The acceleration sensor in the illustrated embodiment is a multi-axis accelerometer. The software application may orient the data captured with the axes of the vehicle. The software application may then calculate the magnitude of acceleration in any one or more of the axes. For example, as shown in FIG. 2, the software application will typically calculate the magnitude of the x-axis and y-axis acceleration.

In the embodiment illustrated in FIG. 2, the location or position data is collected using a GPS receiver. The software application will typically use the speed information and the course information provided from the GPS receiver to calculate the course change rate multiplied by the speed. The software application may calculate the acceleration in the x-axis and the y-axis using course change rate multiplied by the speed information. The software application may calculate the magnitude of the GPS based acceleration in the x-axis and y-axis.

Once the x-axis and y-axis acceleration magnitudes of both the accelerometer data and the GPS receiver data have been calculated, the software application can then calculate a cross correlation between the two datasets using the x-axis and y-axis acceleration magnitudes in the respective datasets.

The software application will typically allow for a time offset between the data in the respective datasets. The allowed time offset will typically be plus or minus 10 seconds, but are smaller time offset such as plus or minus 5 seconds may be used. The allowed time offset cannot be too long because this will lead to a lower cross-correlation and increase the amount of calculations to be performed but similarly, the allowed time offset cannot be too short. An allowed time offset of between 5 seconds and 10 seconds, typically closer to 10 seconds has been found to be optimal.

The software application will preferably calculate a cross-correlation between the datasets at different time offsets in order to identify the time offset which provides the best or maximum cross-correlation.

The data in the respective datasets may be smoothed or filtered. Preferably, any smoothing or filtering will take place after the calculation of the cross-correlation between the datasets. Any method of smoothing or filtering may be used, for example, a five-point Savotzsky Golay filter may be used.

The software application can then apply the identified time offset corresponding to the maximum correlation to one of the datasets in order to synchronise that dataset with the other of the datasets.

Figures 6A, 6B, 6C:
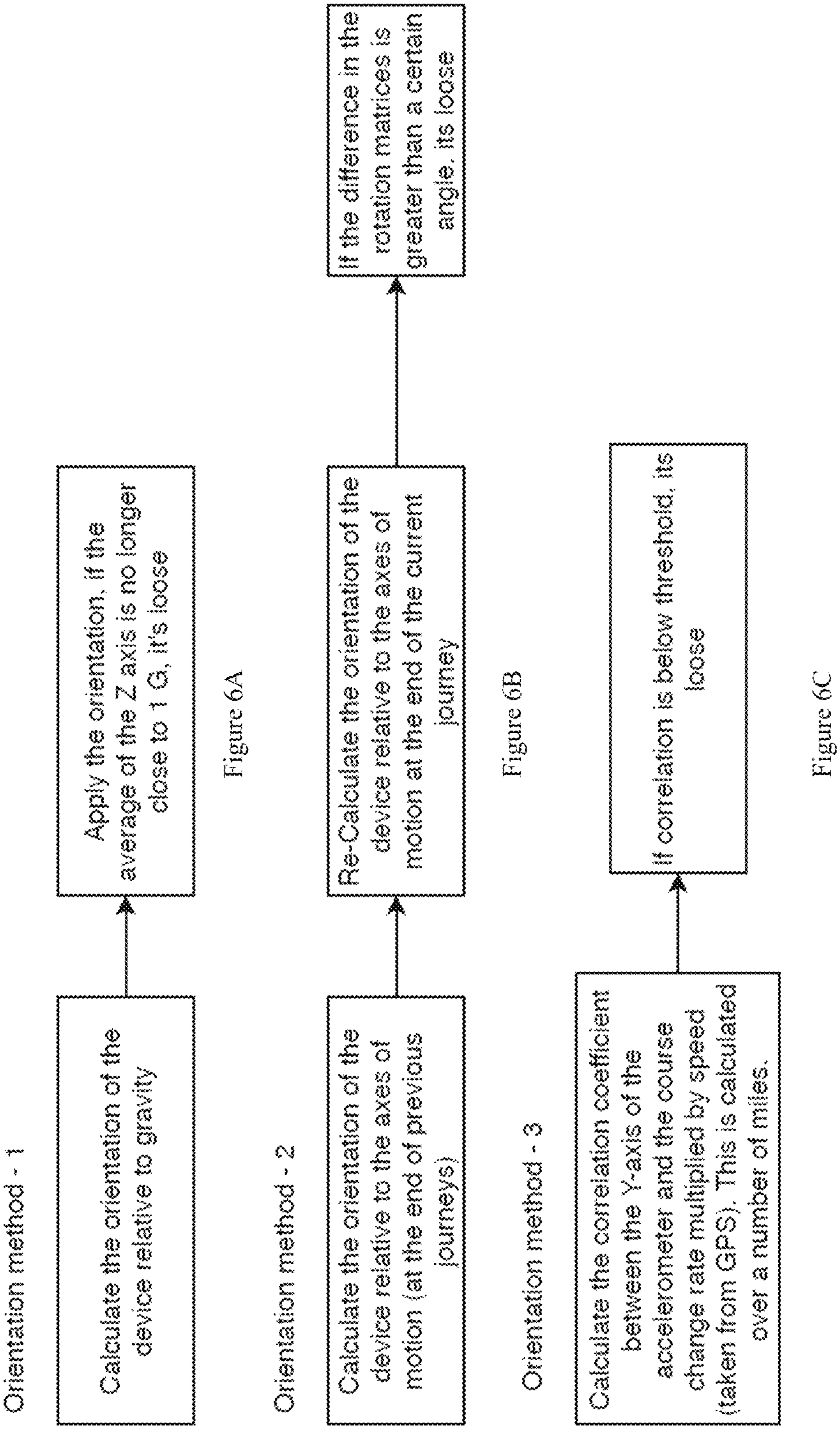
FIG. 6A is a flow diagram showing a first orientation detection method according to an embodiment.
FIG. 6B is a flow diagram showing a second orientation detection method according to an embodiment.
FIG. 6C is a flow diagram showing a third orientation detection method according to an embodiment.

A number of loose box detection algorithms or methods are illustrated in FIGS. 5A to 6C. The algorithms or methods illustrated in FIGS. 6A to 6C are primarily directed toward detecting when the in-vehicle information capture device or box is completely loose within the vehicle and the algorithms or methods illustrated in FIGS. 5A to 5C are primarily directed toward detecting when the in-vehicle information capture device or box is fixed in position within the vehicle but is too loose to be reliable.

The software application will typically undertake a tiered detection. The software application will typically first determine whether the in-vehicle information capture device is completely loose (not fixed to any surface within the vehicle). If it is determined that the in-vehicle information capture device is fixed to a surface, the software application may determine whether the mounting of the in-vehicle information capture device is too loose to provide reliable and/or accurate information.

As shown in FIG. 6A, the software application may analyse acceleration data to calculate the orientation of the in-vehicle information capture device relative to gravity. The data from the at least one acceleration sensor can be monitored over time. For example, if the (average of) acceleration data of at least one of the axes does not remain relatively close to 1 g over time, then the in-vehicle information capture device will normally be completely loose. As mentioned above, it is normally acceleration in the vertical or z-axis which is monitored to determine whether the in-vehicle information capture device is completely loose.

Alternatively, the method may calculate the orientation of the in-vehicle information capture device relative to the axes of motion known from a previous time as shown in FIG. 6B. For example, the orientation of the in-vehicle information capture device will typically be fixed at the end of one journey and this is typically known or can be assumed at the start of the next journey. The method may calculate the orientation of the in-vehicle information capture device relative to the axes of motion at the end of a current journey and save this information for comparison purposes. The method may calculate the orientation of the in-vehicle information capture device relative to the axes of motion at the end of the previous journey. In the comparison, if the difference in the rotational matrices is greater than a predetermined angle between the end of the previous journey and the start of the current journey, then the in-vehicle information capture device is generally classified as completely loose.

Alternatively, a correlation coefficient may be calculated between acceleration data in at least one axis, and course change rate information available from a location sensor as shown in FIG. 6V. Generally, a location sensor (one example is a GPS receiver) will not capture acceleration data but will capture sufficient data from which acceleration data can be calculated or derived. Generally, this acceleration data is calculated using the course change rate (or rate of change in course or heading) multiplied by speed of travel. If the correlation coefficient calculated is below a predetermined correlation threshold, then the in-vehicle information capture device is generally classified as completely loose.

In one form, the mount security detection method may use the acceleration data to calculate minimum value, maximum value and a mean value of acceleration each second as shown in FIG. 5A. These values may be calculated over a number of axes, typically three axes, the x, y and z axes. As mentioned above, the data may be collected at a greater frequency, but in this form, the detection method preferably calculates a minimum value, a maximum value and a mean value of acceleration each second. The detection method may then calculate the 75th percentile of the difference between the minimum value and the maximum value at each point. This 75th percentile value can then be compared to a predetermined threshold to indicate whether the in-vehicle information capture device is loose or not.

In another form, the mount security detection method may use the acceleration data sample at a frequency greater than 1 Hz, such as 100 Hz as illustrated in FIG. 5B. The detection method may examine the data sample from a time period immediately before a possible impact. The time period is typically 1 to 2 seconds. Where a one second time period is used prior to a possible impact, there will be 100 data values if the collection frequency is 100 Hz. In this form, the detection method will preferably compute the differences between an acceleration point value measured and a smoothed or filtered value. Typically, the detection method will implement this for each axis of acceleration. Although any smoothed or filtered value may be used, a polynomial filter or an average value filter such as a five-point median filter may be used. The detection method may then calculate the mean of the absolute value of the differences. The detection method may then take the maximum value of the mean for from each of the averages (there will be three averages if there is an x, y and z axis, one for each axis) and compare the maximum value to a threshold.

In yet another form, the mount security detection method may use the acceleration data sample at a frequency greater than 1 Hz, such as 100 Hz but also examining the data sample from a time period immediately before a possible impact as shown in FIG. 5C. The time period in FIG. 5C is 1 second prior to a possible impact. Where a one second time period is used prior to a possible impact, there will be 100 data values if the collection frequency is 100 Hz. In this form, the detection method may compute the Fast Fourier transform (FFT) magnitude for each axis of acceleration. The detection method may then take the maximum value for each frequency, across the three acceleration axes. The detection method may then select the frequencies in a range, for example, between 30 and 50 Hz and calculate the 75th percentile of their magnitudes and compare the 75th percentile value to the threshold.

The threshold is typically set as a point value to denote "looseness". The threshold may be set using a machine learning algorithm. The threshold may move dynamically over time.

The one or more embodiments are described above by way of example only. Many variations are possible without departing from the scope of protection afforded by the appended claims.

The invention claimed is:

1. An impact detection system for a vehicle, the system comprising:

a. an in-vehicle information capture device for vehicle monitoring having at least one sensor to capture input information in relation to at least one measurable parameter relating to the vehicle, and at least one internal power supply independent of a vehicle power supply, the in-vehicle information capture device being located in a fixed position within the vehicle; and b. a mobile computing device operating a software application with an impact detection algorithm to detect an impact based on the input information sensed by the in-vehicle information capture device and, when an impact is detected, to push an electronic notification of the impact detection to a third-party system, wherein the software application operating on the mobile computing device is initialised each time the mobile computing device comes into range of the in-vehicle information capture device.

2. The impact detection system as claimed in claim 1 wherein the in-vehicle information capture device comprises one or more accelerometer to capture acceleration data in one or more axes.

3. The impact detection system as claimed in claim 1 wherein the in-vehicle information capture device comprises one or more position or location sensors to capture information in relation to location over time.

4. The impact detection system as claimed in claim 1 wherein the software application includes at least two operating languages and/or a converter to convert between the two operating languages and at least one portion of the software application is provided in a language of an operating system of the mobile computing device in order to interface with hardware components of the mobile computing device and at least one portion of the software application provided in a secondary language more appropriate for implementation of the impact detection algorithm.

5. The impact detection system as claimed in claim 4 wherein the secondary language is a machine learning language to allow evolution of the at least one portion of the software application provided in the secondary language.

6. The impact detection system as claimed in claim 4 wherein the impact detection algorithm is written in a block format, with at least some blocks provided in the secondary language, and at least some other blocks provided in the language of an operating system of the mobile computing device.

7. The impact detection system as claimed in claim 6 wherein one or more conversion blocks are included to convert between the language of an operating system of the mobile computing device and the secondary language.

8. The impact detection system as claimed in claim 1 wherein the software application applies the impact detection algorithm and when a possible impact is detected, the software application will typically request one or more form of user engagement with the software application in order to confirm that an actual impact has taken place.

9. The impact detection system as claimed in claim 1 wherein the impact detection algorithm is initiated when the in-vehicle information capture device establishes a link with the software application operating on the mobile computing device through proximity of the mobile computing device with the in-vehicle information capture device.

10. The impact detection system as claimed in claim 1 wherein the impact detection algorithm operates in real time.

11. The impact detection system as claimed in claim 1 wherein, when a possible impact is detected by the in-vehicle information capture device, the in-vehicle information capture device flags the possible impact with the impact detection algorithm operating on the mobile computing device.

12. The impact detection system as claimed in claim 1 wherein the impact detection algorithm identifies a possible impact in the one or more datasets of information captured by the in-vehicle information capture device based on the at least one measurable parameter.

13. The impact detection system as claimed in claim 1 wherein the impact detection algorithm has access to at least one location or position sensor dataset from at least one location or position sensor and at least one acceleration sensor dataset from at least one acceleration sensor in the in-vehicle information capture device.

14. The impact detection system as claimed in claim 13 wherein the impact detection algorithm synchronises the location or position sensor dataset with the acceleration sensor dataset.

15. The impact detection system as claimed in claim 13 wherein the impact detection algorithm checks a security of mounting of the in-vehicle information capture device before proceeding to determine whether a possible impact is an actual impact.

16. The impact detection system as claimed in claim 1 wherein following a possible impact, the impact detection algorithm issues a push notification to a user requesting acknowledgement of the push notification within a specific time.

17. The impact detection system as claimed in claim 16 wherein when acknowledgement is received from the user within the specific time, the software application causes generation and display of an impact question on the mobile computing device for a user such that if the user answers yes to the impact question, the software application issues the notification directly to the at least one third party.

18. The impact detection system as claimed in claim 1 further comprising a central computer server using any output of logged decisions in relation to possible impacts and actual impacts from the software application operating on the mobile computing device to evolve the impact detection algorithm over time wherein evolution of the impact detection algorithm is performed at the central server to ensure that all decisions are consistent across one or more mobile computing devices and consistent against any central server decision making and/or to ensure appropriate controls and validation of decisions are done before release of any evolved impact detection algorithm.

19. The impact detection system as claimed in claim 1 further including a rules engine to control interaction with an in-vehicle user post-impact based on information collected from the in-vehicle information capture device, to ensure safe interaction with the user.

* * * * *